(12) United States Patent
Sasaki

(10) Patent No.: US 9,699,376 B2
(45) Date of Patent: Jul. 4, 2017

(54) IMAGING APPARATUS AND CONTROL METHOD THEREOF

(71) Applicant: CANON KABUSHIKI KAISHA, Tokyo (JP)

(72) Inventor: Koichi Sasaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 38 days.

(21) Appl. No.: 14/659,719

(22) Filed: Mar. 17, 2015

(65) Prior Publication Data

US 2015/0281573 A1    Oct. 1, 2015

(30) Foreign Application Priority Data

Mar. 25, 2014 (JP) ................. 2014-062731
Jan. 20, 2015 (JP) ................. 2015-008958

(51) Int. Cl.
*H04N 5/232* (2006.01)
*H04N 5/77* (2006.01)
*H04N 9/804* (2006.01)
*H04N 9/82* (2006.01)

(52) U.S. Cl.
CPC ......... *H04N 5/23229* (2013.01); *H04N 5/772* (2013.01); *H04N 9/8042* (2013.01); *H04N 9/8205* (2013.01)

(58) Field of Classification Search
CPC .. H04N 5/23229; H04N 5/772; H04N 9/8042; H04N 9/8205
See application file for complete search history.

(56) References Cited

U.S. PATENT DOCUMENTS

| | | | |
|---|---|---|---|
| 7,768,553 B2* | 8/2010 | Kamiya | H04N 1/2112 348/220.1 |
| 8,144,231 B2 | 3/2012 | Miyashita | |
| 8,218,023 B2 | 7/2012 | Gwak et al. | |

(Continued)

FOREIGN PATENT DOCUMENTS

JP    2011-244423 A    12/2011

OTHER PUBLICATIONS

Related U.S. Appl. No. 14/645,962, filed Mar. 12, 2015, entitled Imaging Apparatus and Control Method Thereof; first named inventor Kiyonori Matsumoto, pp. 1-86.

(Continued)

*Primary Examiner* — Padma Haliyur
(74) *Attorney, Agent, or Firm* — Carter, DeLuca, Farrell & Schmidt, LLP

(57) ABSTRACT

During capturing, image data obtained by applying a simplified development process to RAW image data is recorded together with a RAW image. Afterward, image data obtained by applying a high quality development process to the RAW image data is generated, and this image data replaces the image data obtained by the simplified development. Information indicating a state of progress of the high quality development process is displayed in association with an image, thereby enabling selection of the processes in consideration of the state of progress. It is possible to achieve an imaging apparatus capable of recording a RAW image without the need of a circuit for performing a high-speed development process and in such a manner that the RAW image can be easily reproduced when necessary.

19 Claims, 10 Drawing Sheets

(56) References Cited

U.S. PATENT DOCUMENTS

| | | | |
|---|---|---|---|
| 8,417,067 B2* | 4/2013 | Nakao | H04N 1/00204 |
| | | | 348/231.2 |
| 2005/0185055 A1 | 8/2005 | Miller et al. | |
| 2006/0221223 A1 | 10/2006 | Terada | |
| 2012/0106852 A1 | 5/2012 | Khawand et al. | |
| 2013/0038738 A1* | 2/2013 | Ando | A61B 6/4266 |
| | | | 348/162 |
| 2015/0205557 A1 | 7/2015 | Oike | |

OTHER PUBLICATIONS

Office Action for corresponding U.S. Appl. No. 15/191,762 mailed Nov. 30, 2016.

* cited by examiner

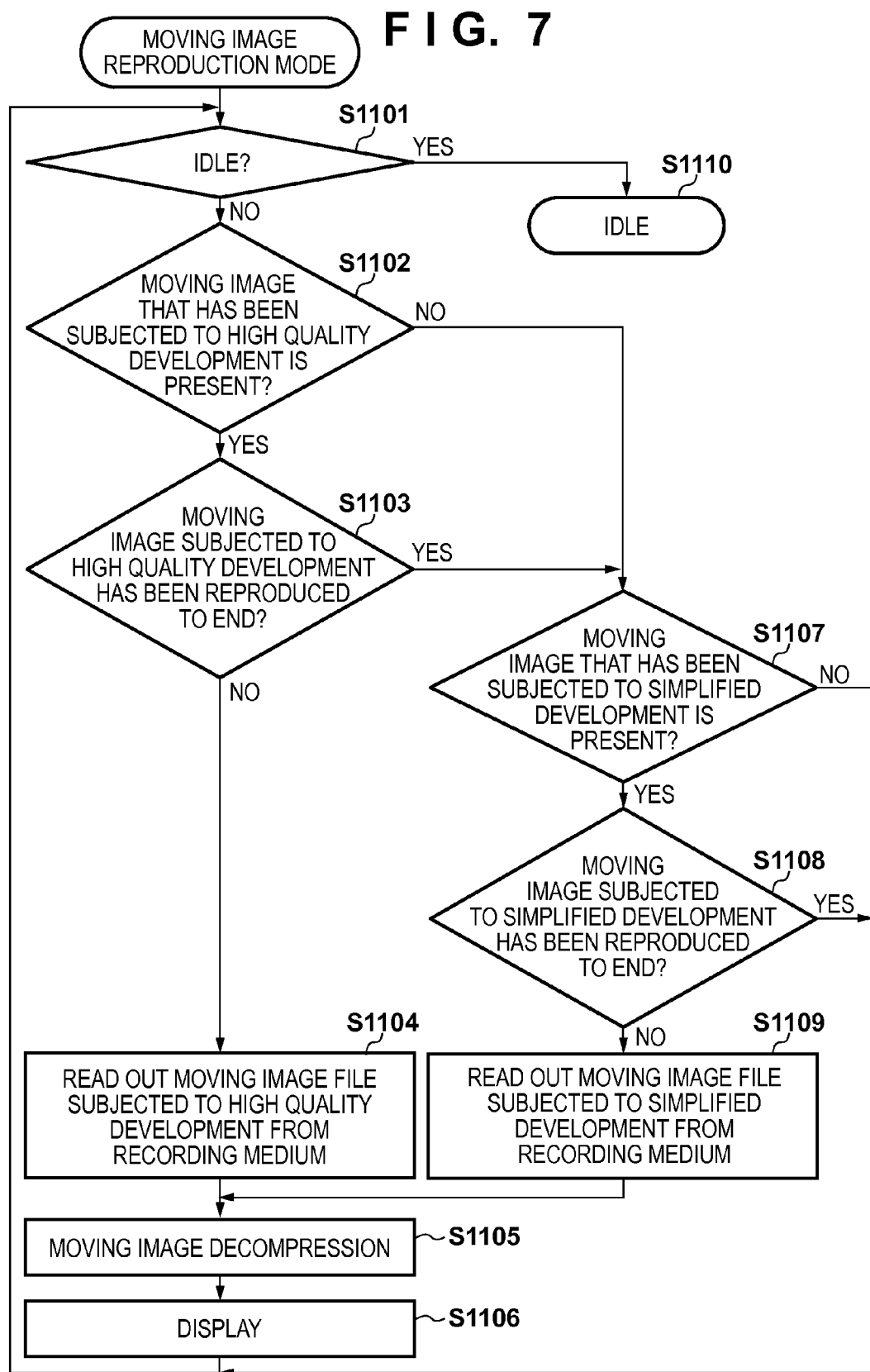

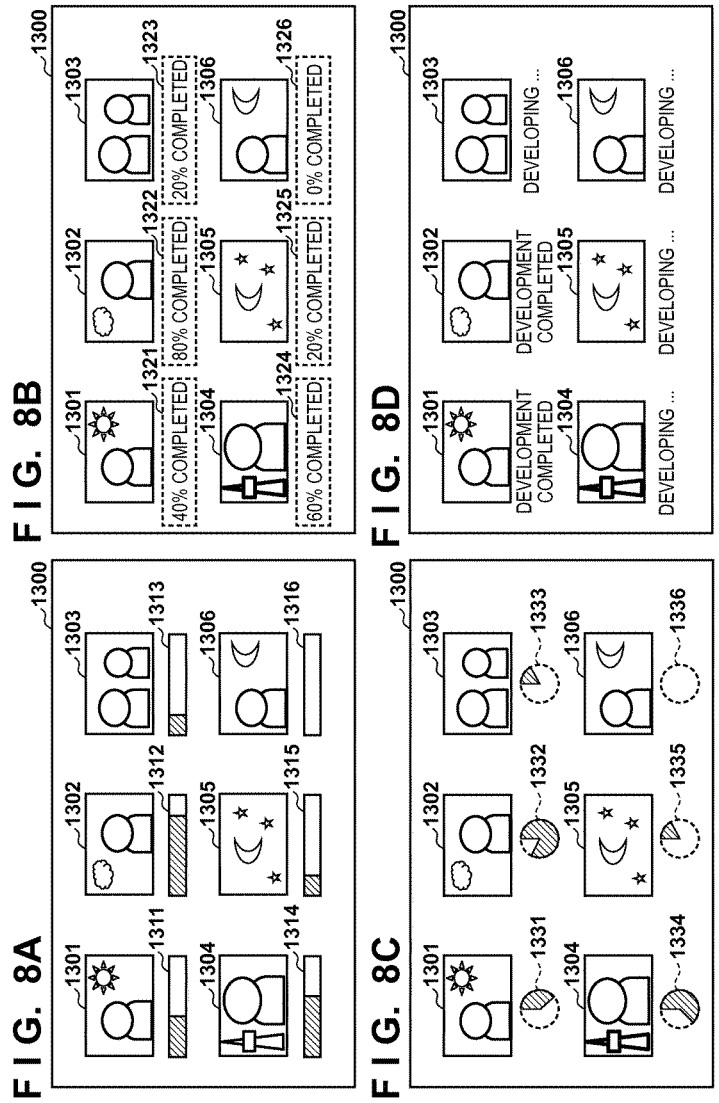

F I G. 9
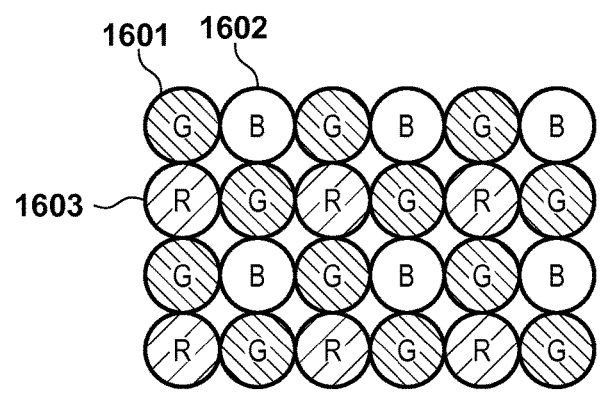
F I G. 10
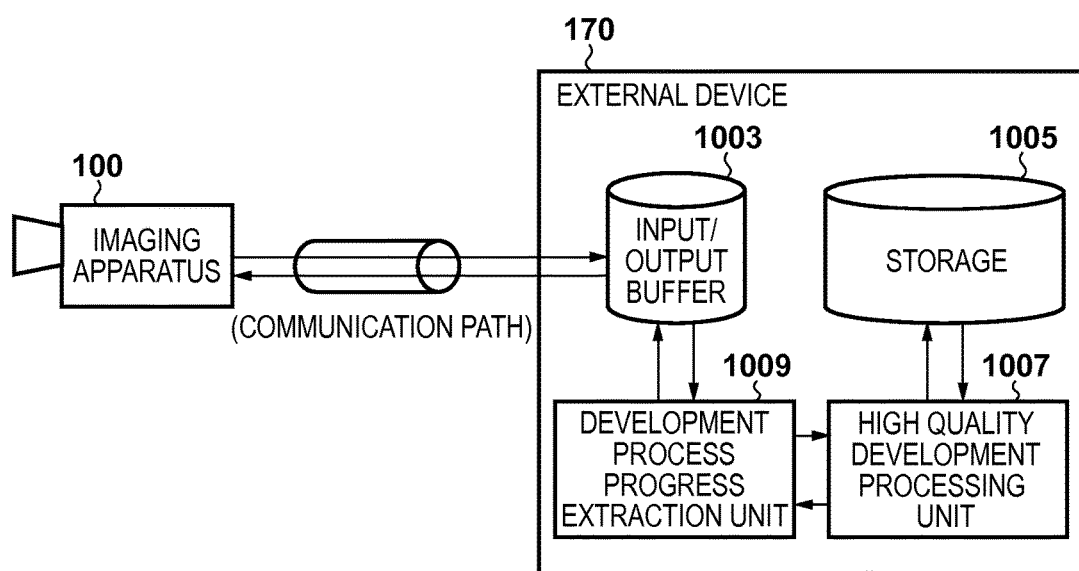

IMAGING APPARATUS AND CONTROL METHOD THEREOF

BACKGROUND OF THE INVENTION

Field of the Invention

The present invention relates to an imaging apparatus and a control method thereof, and particularly to a technique for handling a RAW image of a moving image or a still image.

Description of the Related Art

Conventionally, an imaging apparatus using an image sensor generally applies the so-called development process to image information (RAW image) obtained by an image sensor, and performs compression encoding on the developed luminance signal and color difference signal, and records the encoded signals in a JPEG format in a recording medium. The development process includes, but is not limited to demosaicing for performing color interpolation on each pixel to generate a signal composed of a luminance and a color difference, noise reduction on the signal, white balancing, optical distortion correction, and image optimization processing.

Meanwhile, there are imaging apparatuses capable of recording RAW images (Japanese Patent Laid-Open No. 2011-244423). As compared with JPEG format or the like, a RAW image requires an enormous amount of data for recording, but is advantageous in that it allows flexible post editing, while minimizing deterioration in image quality. In addition, Japanese Patent Laid-Open No. 2011-244423 describes that development parameters for use in a development process of a RAW image are recorded together with the RAW image.

Due to recent advancements of image sensors, the number of pixels per image has been significantly increased. Consequently, the throughput necessary for the development process of the RAW image has also been increased, and hardware having high processing capability is required in order to achieve a real-time development process in parallel with capturing. In general, at least one of the circuit scale and the power consumption of hardware having high processing capability tends to increase, but restrictions in terms of, for example, an implementable area, power consumption, and costs, are imposed on implementable hardware. As a result, there may be a case where the capability (e.g., continuous shooting capability) of the imaging apparatus depends on the development processing capability.

When a configuration in which a RAW image is recorded without being developed is adopted, whether the development process can be applied in real time would not be a problem. However, the amount of data recorded is increased, and it may thus be necessary to increase the buffer amount. Additionally, although the development process is necessary to check a result of capturing, the data format of the RAW image is unique to each manufacturer. Accordingly, an appropriate development process may not be able to be applied by an apparatus different from the imaging apparatus that has performed capturing, and there is the risk of impairing user convenience.

As such, in order for high capturing capacity and high-speed reproduction of captured images to be achieved, it has been necessary to enable a high cost and high power consumption circuit having high processing capability to be installed and driven at high output, or to enable a recorded RAW image to be reproduced at high speed.

SUMMARY OF THE INVENTION

It is an object of the present invention to provide an imaging apparatus capable of recording a RAW image without the need of a circuit for applying a high-speed development process and in such a manner that the RAW image can be easily reproduced when necessary, and a control method thereof.

According to an aspect of the present invention, there is provided an imaging apparatus comprising: an imaging unit configured to generate RAW image data representing an undeveloped image which is captured by an image sensor in response to a capturing instruction; a development unit configured to generate image data by applying, to the RAW image data, a first development process or a second development process that can provide an image having higher image quality than that obtained by the first development process; a recording unit configured to read and write data from and to a recording medium; a control unit configured to control the recording unit so as to write, to the recording medium, the RAW image data and first image data obtained by applying the first development process to the RAW image data, and thereafter control the development unit and the recording unit so as to generate second image data by applying the second development process to the RAW image data written to the recording medium and write the second image data to the recording medium; and a display processing unit configured to display information indicating a state of progress of the second development process for the RAW image data recorded in the recording medium.

According to another aspect of the present invention, there is provided a control method of an imaging apparatus including: an imaging unit configured to generate RAW image data representing an undeveloped image which is captured by an image sensor in response to a capturing instruction; a development unit configured to generate image data by applying, to the RAW image data, a first development process or a second development process that can provide an image having higher image quality than that obtained by the first development process; and a recording unit configured to read and write data from and to a recording medium, the method comprising the steps of: controlling the recording unit so as to write, to the recording medium, the RAW image data and first image data obtained by applying the first development process to the RAW image data; controlling the development unit and the recording unit so as to generate second image data by applying the second development process to the RAW image data written to the recording medium and write the second image data to the recording medium; and displaying information indicating a state of progress of the second development process for the RAW image data recorded in the recording medium.

Further features of the present invention will become apparent from the following description of exemplary embodiments with reference to the attached drawings.

BRIEF DESCRIPTION OF THE DRAWINGS

FIG. 7 is a flowchart illustrating operations in a moving image reproduction mode of the imaging apparatus according to an embodiment.

FIGS. 8A to 8D are diagrams showing an exemplary screen for presenting a state of progress of a high quality development process that is displayed by the imaging apparatus according to an embodiment.

FIG. 9 is a diagram showing an example of a pixel pattern in an image sensor unit of the imaging apparatus according to an embodiment.

FIG. 10 is a block diagram showing an exemplary system configuration composed of the imaging apparatus according to an embodiment and an external device.

DESCRIPTION OF THE EMBODIMENTS

Exemplary embodiments of the present invention will now be described in detail in accordance with the accompanying drawings.

Figure 1:
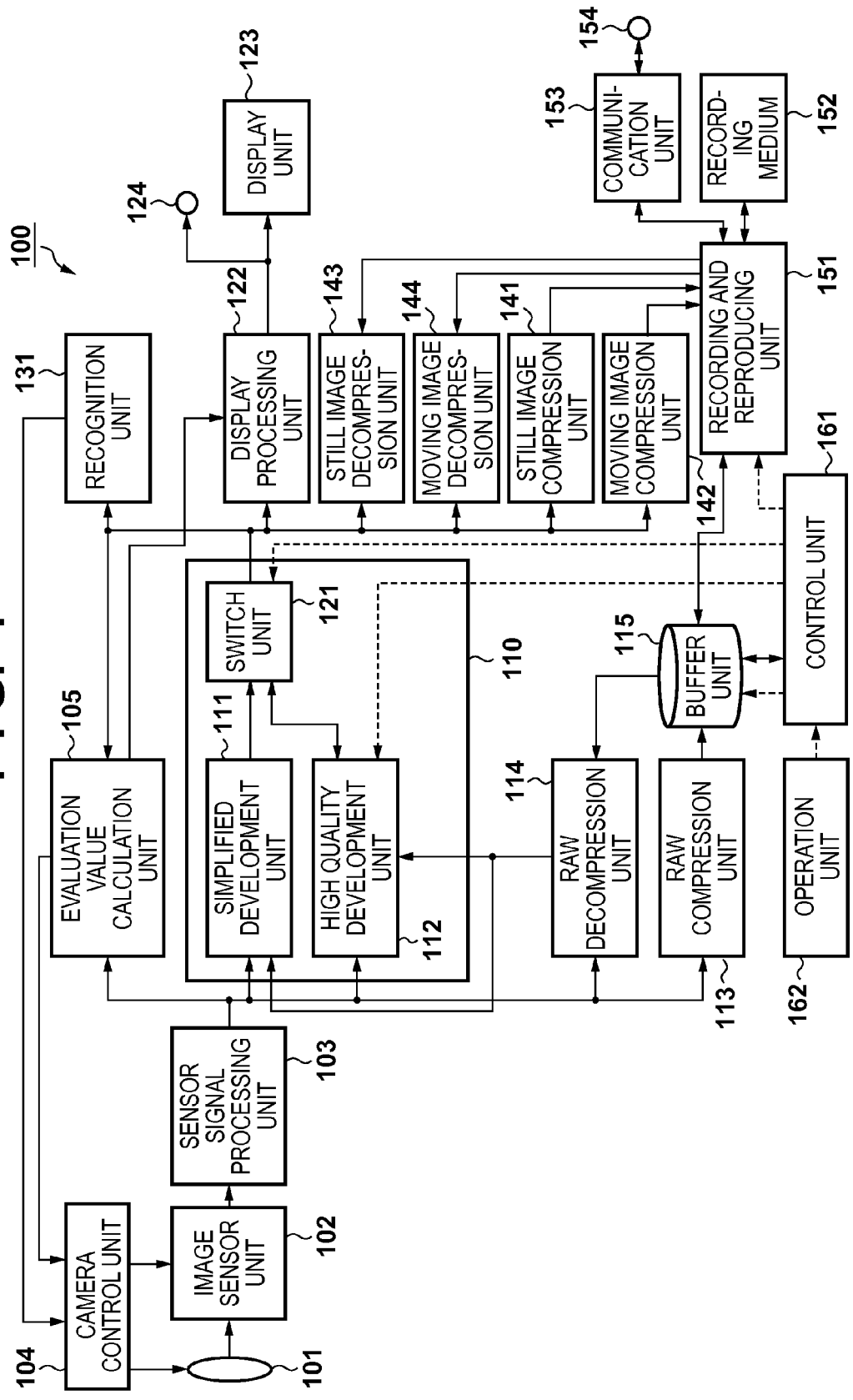
FIG. 1 is a block diagram showing an exemplary configuration of an imaging apparatus according to an embodiment of the present invention.

FIG. 1 is a block diagram showing an exemplary functional configuration of an imaging apparatus according to an embodiment of the present invention. These functional blocks may be implemented by dedicated hardware such as an ASIC, or may be implemented through software by a general-purpose processor such as an MPU executing a program.

An imaging apparatus 100 shown in FIG. 1 has not only the function of recording image data obtained by imaging a subject image in a recording medium, but also the function of reproducing the image data from the recording medium, and developing and displaying the image data, and the function of sending and receiving the image data to and from an external apparatus, a server (cloud) or the like. Therefore, the imaging apparatus according to the embodiment of the present invention can be represented as an image processing apparatus, a recording apparatus, a reproducing apparatus, a recording and reproducing apparatus, a communication apparatus, or the like.

Referring to FIG. 1, a control unit 161 includes a programmable processor such as a CPU or an MPU and a non-volatile memory storing a control program executed by the programmable processor, and controls the overall processing of the imaging apparatus 100. Note that a signal line for performing control and communication is connected from the control unit 161 to each of the various functional blocks although only a part thereof is shown in FIG. 1 in order to avoid the complexity of illustration. An operation unit 162 includes an input device, such as a key, a button, or a touch panel, that is used by the user to provide an instruction to the imaging apparatus 100. An operation signal from the operation unit 162 is detected by the control unit 161, and the control unit 161 controls other functional blocks or the like such that an operation in accordance with the detected operation is performed. A display unit 123 displays an image that is provided through a display processing unit 122, including, for example, an image captured or reproduced by the imaging apparatus 100, a menu screen, or a various types of information, and the like. The display unit 123 includes, for example, a Liquid Crystal Display (LCD) or the like.

A subject image that is to be imaged is imaged on an image sensor unit 102 via an imaging optical unit 101. In response to a capturing start instruction provided by the operation unit 162, the control unit 161 starts capturing and recording operations. Note that it is possible to adopt a configuration in which moving image capturing is performed in order to achieve a live-view display during standby for capturing. The operations of the imaging optical unit 101 and the image sensor unit 102 are controlled by the control unit 161 on the basis of results of calculating evaluation values, including, for example, an aperture, focus, camera shake, and the like obtained by an evaluation value calculation unit 105, and subject information from a recognition unit 131.

The image sensor unit 102 may be, for example, a CCD image sensor or CMOS image sensor that converts light transmitted through a color filter of red, green, and blue (RGB) disposed for each pixel into an electric signal. FIG. 9 illustrates an example of a color filter disposed in the image sensor unit 102, showing a pixel pattern in an image handled by the imaging apparatus 100. As shown in FIG. 9, red (R) 1603, green (G) 1601, and blue (B) 1602 are arranged in a mosaic pattern for each pixel, and the color filter has a structure in which sets of pixels are regularly arranged, with each set being composed of one red pixel, one blue pixel, and two green pixels for every four pixels of 2×2. Such an array of color filters is usually called the primary color Bayer pattern. The image sensor unit 102 of the present embodiment has the capability of outputting image data for 8000 pixels wide×4000 pixels high at 60 frames per second. Note that the colors and pattern constituting the color filter are not limited to those of the primary color Bayer pattern, and it is possible to adopt any other pattern.

The electric signal converted by the image sensor unit 102 is subjected to a pixel correction process by a sensor signal processing unit 103. The correction process includes processing of interpolating pixels to be corrected by using the values of surrounding pixels or processing of subtracting a predetermined offset value for the values of missing pixels or pixels with low reliability in the image sensor unit 102. In the present embodiment, image data that is output from the sensor signal processing unit 103 is referred to as RAW image data, which means an image that has not been developed. Note that the bit length compression of the image data may be performed within the sensor signal processing unit 103 by using an encoding technique such as differential pulse-code modulation (DPCM). This is more effective since the occupied amount of the bus band during data transmission is reduced. In that case, the image data compressed in the sensor signal processing unit 103 and the restored image data thereof are also handled in the category of the above-described RAW image data.

The RAW image data output from the sensor signal processing unit 103 is developed by a development unit 110. The development unit 110 includes a plurality of (in the present embodiment, two) different development processing units, which have different levels of the processing precision and different priorities of the processing load. In the present embodiment, the development unit 110 is composed of a simplified development unit 111 that applies a first development process and a high quality development unit 112 that applies a second development process, and includes a switch unit 121 that selects between the outputs therefrom. The simplified development unit 111 and the high quality development unit 112 both apply, to the RAW image data, a development process such as debayering (also called demosaicing or color interpolation), white balance adjustment, RGB to YUV conversion, noise reduction, and optical distortion correction. Note that these are examples of the processing included in the development process, and it is not intended to mean that all of them are essential for the development process. Other processing may also be included or a part of the above-mentioned processing may not be included in the development process.

The high quality development unit 112 performs various types of processing with higher precision than the simplified development unit 111. Due to the higher precision, the high quality development unit 112 provides a developed image having higher image quality than that can be obtained by the simplified development unit 111, but requires a large processing load at the same time. On the other hand, the simplified development unit 111 reduces the number of pixels on one screen of the RAW image data to 2000 pixels wide×1000 pixels high. Furthermore, due to the lower processing precision than that of the high quality development unit 112, the simplified development unit 111 can apply the development process at high speed during capturing, although the obtained image quality is lower than that obtained by the high quality development unit 112. In this way, the simplified development unit 111 is configured to process image data having a smaller number of pixels than that of the RAW image data, and also to perform the processing in a simplified manner, thus reducing the throughput. Since the processing load of the simplified development unit 111 is small, the simplified development unit 111 is used for real-time development performed in parallel with a capturing operation. The switch unit 121 is switched by the control unit 161 in accordance with the operation content instructed through the operation unit 162 by the user or the control corresponding to the operating mode being executed.

Although the present embodiment illustrates a configuration in which the simplified development unit 111 and the high quality development unit 112 exist independently within the development unit 110, it is possible to adopt a configuration in which a single development unit switches the operating modes so as to perform the simplified development and the high quality development exclusively. Further, it is sufficient that the plurality of development units have processing loads that are different from one another, and it is not essential to lower both the size of the image to be processed and the processing precision. For example, the plurality of development units may include development units having the same number of pixels to be processed, but different levels of processing precision, or development units having the same level of processing precision, but different numbers of pixels to be processed. However, the plurality of development units need to include at least one development unit capable of completing the development process of the captured image until the start of capturing the next image.

Although FIG. 1 shows the RAW image data from the sensor signal processing unit 103 as being input to the simplified development unit 111 and the high quality development unit 112 within the development unit 110, this does not mean that the development process for the same RAW image data is applied by both of the development units. In terms of the processing load, basically, only a single development unit executes the development process. Accordingly, the switch unit 121 may be provided so as to switch the development unit to which the RAW image data is input.

The image data developed by the development unit 110 is subjected to predetermined processing performed by the display processing unit 122, and is thereafter displayed in the display unit 123. Alternatively, the developed image data may be output through a video output terminal 124 to a display device connected outside. The video output terminal 124 includes, for example, a general-purpose interface such as HDMI (registered trademark) or SDI.

The image data developed by the development unit 110 is also supplied to the evaluation value calculation unit 105. The evaluation value calculation unit 105 calculates, from the image data, evaluation values such as a state of focus and a state of exposure, for example. These evaluation values are used, for example, for auto focus detection and auto exposure control performed by the control unit 161.

The image data developed by the development unit 110 is also supplied to the recognition unit 131. The recognition unit 131 has the function of detecting and recognizing subject information contained in the image data. For example, the recognition unit 131 detects a person's face contained in the image represented by the image data, and outputs information indicating the position and the size of the face if the face is detected. The recognition unit 131 may also perform, for example, authentication of a specific person based on feature information such as that of the face.

The image data developed by the development unit 110 is also supplied to a still image compression unit 141 and a moving image compression unit 142. The still image compression unit 141 is used in the case of compressing the image data as a still image. The still image compression unit 141 encodes still image data in accordance with a known encoding scheme such as JPEG. The moving image compression unit 142 is used in the case of compressing the image data as a moving image. The moving image compression unit 142 encodes moving image data in accordance with a known encoding scheme such as H.264 or H.265. Each of the still image compression unit 141 and the moving image compression unit 142 performs high-efficiency encoding (compression encoding) on the target image data to generate image data whose information amount has been compressed, and sends that image data to a recording and reproducing unit 151.

A RAW compression unit 113 applies wavelet transform, differential encoding, and the like to the RAW image data output from the sensor signal processing unit 103 to generate compressed RAW data whose data amount has been reduced. The RAW compression unit 113 stores the compressed RAW data in a buffer unit 115. The buffer unit 115 may be any storage device, including, for example, a memory or an HDD. The compressed RAW data may be stored in the buffer unit 115, or may be moved further to a different recording medium after being stored, and be deleted from the buffer unit 115.

The recording and reproducing unit 151 records the still image data from the still image compression unit 141 and the moving image data from the moving image compression unit 142 in a recording medium 152. The recording and reproducing unit 151 records the still image and moving image data in the state of RAW data read out from the buffer unit 115 in the recording medium 152 as a RAW file separate from the compressed still image data and moving image data. The recording and reproducing unit 151 manages the data recorded in the recording medium 152 as a file in accordance with a known file system such as FAT. The recording medium 152 is, for example, a built-in memory or hard disk having a large capacity, or a removable memory card or the like. The recording and reproducing unit 151 can also read out a still image file, a moving image file, and a RAW file (still image, moving image) from the recording medium 152. The recording and reproducing unit 151 can write or read out various data files to and from an external storage or server via a communication unit 153. The communication unit 153 provides the imaging apparatus 100 with an access to a computer network or an external device by wireless communication or wired communication through a communication terminal 154.

The recording and reproducing unit 151 obtains the desired file from the recording medium 152 or via the communication unit 153 and reproduces it. If the file to be reproduced is a RAW file, the recording and reproducing unit 151 stores the obtained RAW file in the buffer unit 115. If the file to be reproduced is a still image file, the recording and reproducing unit 151 supplies the obtained still image file to the still image decompression unit 143. If the file to be reproduced is a moving image file, the recording and reproducing unit 151 supplies the obtained moving image file to the moving image decompression unit 144.

The RAW decompression unit 114 reads out the RAW file stored in the buffer unit 115, and decodes and decompresses the compressed RAW data. The RAW data decompressed by the RAW decompression unit 114 is supplied to the simplified development unit 111 and the high quality development unit 112 of the development unit 110.

The still image decompression unit 143 decodes and decompresses the input still image file, and supplies the decompressed still image file as the reproduced image of the still image to the display processing unit 122. The moving image decompression unit 144 decodes and decompresses the input moving image file, and supplies the decompressed moving image file as the reproduced image of the moving image to the display processing unit 122. The still image and moving image processed by the display processing unit 122 are displayed in the display unit 123.

Figure 2:
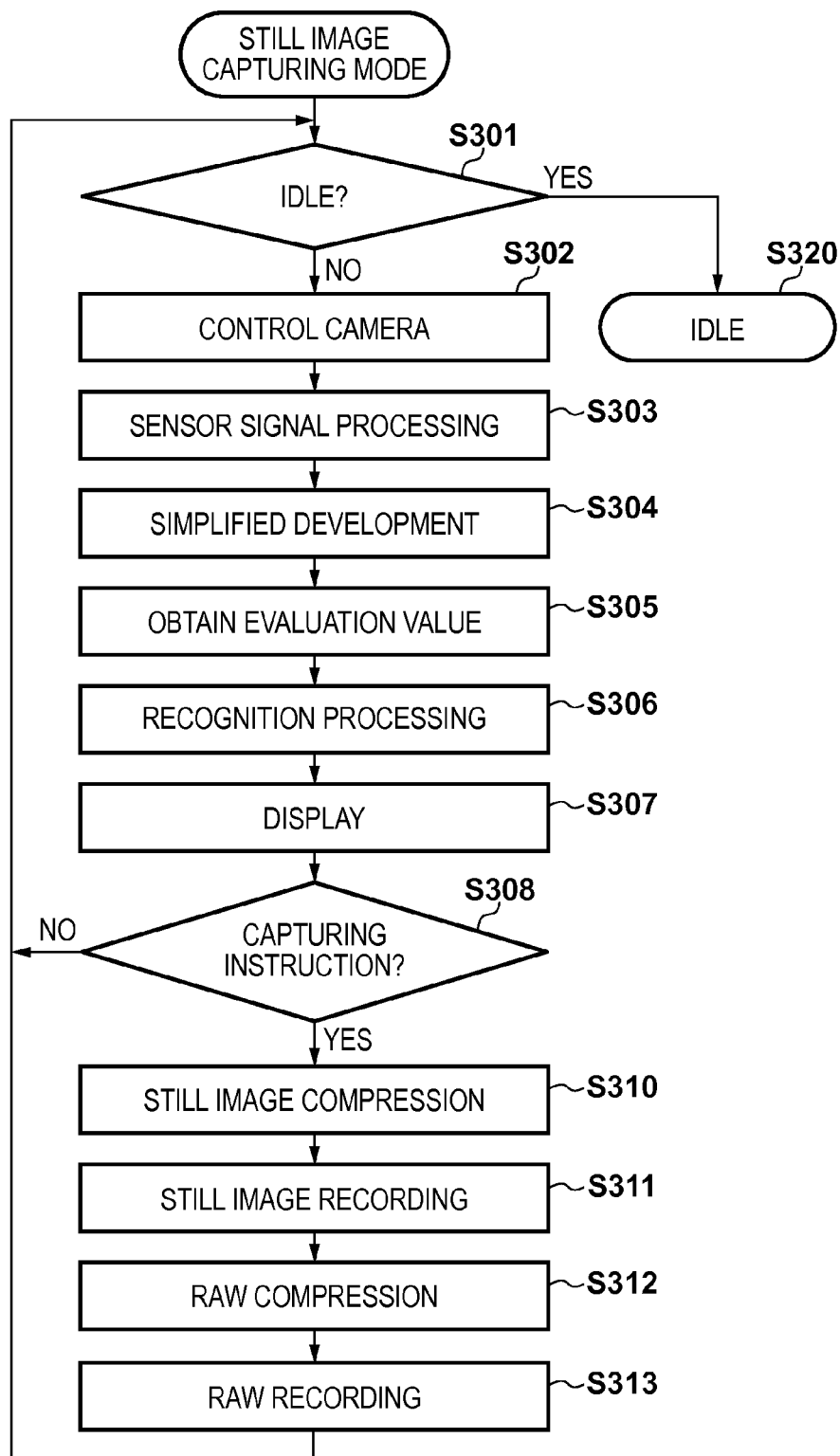
FIG. 2 is a flowchart illustrating operations in a still image capturing mode of the imaging apparatus according to an embodiment.

Next is a description of the operations in a capturing mode of the imaging apparatus 100 with reference to the flowchart shown in FIG. 2. Unless otherwise specified, the flowchart in FIG. 2 illustrates the procedure of the processing implemented by the control unit 161 controlling the functional blocks shown in FIG. 1. Specifically, the processing is implemented by loading a program, which is stored in a non-volatile memory included in the control unit 161, into a memory (RAM) and then executing the program by the CPU.

The control unit 161 determines whether the processing load state of the imaging apparatus 100 is low (S301), and causes the processing to transition to the idle state according to the load state (S320); otherwise advances the processing to S302. The load state can be determined according to the operating ratio of the CPU included in the control unit 161, or whether a predefined high-load operation, including, for example, a rapid continuous shooting operation, is being performed, but the present invention is not limited thereto. If the processing load is not low enough to transition to the idle state, the control unit 161 advances the processing to S302. Note that processing for the determination as to whether to transition to the idle state will be described later.

At S302, the control unit 161 controls the operations of the imaging optical unit 101 and the image sensor unit 102. For example, the control unit 161 causes a zoom lens or a focus lens included in the imaging optical unit 101 to move in accordance with a zoom instruction or a capturing preparation instruction from the user through the operation unit 162, and sets the readout area of the image sensor unit 102 in accordance with an instruction regarding the number of captured pixels. In addition, the control unit 161 implements control of the focus and the tracking for a specific subject on the basis of the information on the evaluation values from the evaluation value calculation unit 105 and subject information from the recognition unit 131. At S302, capturing is performed under a capturing condition in accordance with a predetermined frame period.

At S303, the sensor signal processing unit 103 performs signal processing for pixel correction on the electric signal converted by the image sensor unit 102. For example, the sensor signal processing unit 103 performs interpolation using the values of surrounding pixels or subtraction of a predetermined offset value on an electric signal corresponding to a missing pixel of an image pickup element and an electric signal of a pixel having low reliability. In the present embodiment, image information that has undergone the processing at S303 and is output from the sensor signal processing unit 103 is referred to as RAW image, which means a raw (undeveloped) image.

At S304, the simplified development unit 111 develops the RAW image data. Note that the control unit 161 controls the state of the switch unit 121 so that the image data developed by the simplified development unit 111 is output from the development unit 110 by the start of S304 at the latest.

The simplified development unit 111 reduces the number of pixels of the RAW image data as described above, thus reducing the image. Then, the simplified development unit 111 performs debayering (demosaicing) on the reduced RAW image data to generate a color signal missing from each pixel, and thereafter converts the color signal into a signal composed of a luminance and a color difference (RGB to YUV conversion). Furthermore, the simplified development unit 111 removes noise contained in each signal, corrects the optical distortion (aberration) of an imaging optical system, and adjusts the white balance. With the use of the simplified development unit 111 that applies the development process after reducing the number of pixels, or performs or omits noise removal and optical distortion correction by processing giving priority to the processing speed, thus reducing or removing the limitation on the capturing capacity of the imaging apparatus 100 imposed by the load (processing speed and power consumption) of the development process, it is possible to achieve, for example, a rapid continuous shooting speed or a number of continuously captured images that cannot be achieved in the case of using the high quality development unit 112.

The image data developed by the simplified development unit 111 is supplied to the evaluation value calculation unit 105 through the switch unit 121. The evaluation value calculation unit 105 calculates evaluation values such as the state of focus of the imaging optical unit 101 and the state of exposure of the image from the luminance value and the contrast value that are contained in the image data by a predetermined method (S305). Note that the evaluation value calculation unit 105 may calculate these evaluation values for the RAW image data prior to the development process.

The image data developed by the simplified development unit 111 is also supplied to the recognition unit 131. The recognition unit 131 applies, to the image data, processing of detecting a subject (e.g., a person's face) having a predefined specific feature to generate subject information. For example, the recognition unit 131 outputs the presence or absence of a face in the image data, the position and the size of the face, information on the individual identified on the basis of the face, and the like as the subject information (S306).

The image data developed by the simplified development unit 111 is also supplied to the display processing unit 122. The display processing unit 122 forms a display image from the obtained image data, and outputs and displays the display image to the display unit 123 or an external display device (S307). The display image displayed by the display unit 123 is used, for example, for a live-view display (capturing through-the-lens image display) for the user to appropriately frame the subject in the capturing standby state. Furthermore, the display processing unit 122 may display, for example, a frame-shaped mark indicating the focus area or the position of the recognized face in the display image in a superimposed manner by utilizing the evaluation values and the subject information supplied from the evaluation value calculation unit 105 and the recognition unit 131.

At S308, the control unit 161 determines whether a capturing instruction has been input from the user through the operation unit 162. If the capturing instruction has been input, the control unit 161 advances the processing to S310, and if the capturing instruction has not been input, the processing from S301 is repeated.

At S310, in response to the capturing instruction, the control unit 161 controls the imaging optical unit 101 and the image sensor unit 102 to start capturing under a predetermined capturing condition. Here, the operations during capturing of a still image will be described. One screen worth of image data obtained by the image sensor unit 102 is supplied to the development unit 110, developed by the simplified development unit 111, and thereafter supplied to the still image compression unit 141. The still image compression unit 141 performs predetermined encoding processing such as JPEG encoding processing (still image compression) on the supplied image data (S310), thus generating still image data. In the present embodiment, the still image data that is developed by the simplified development unit 111 and is encoded by the still image compression unit 141 during capturing in this manner is referred to as simplified still image data (first encoded image data). Note that the encoding method is not limited to the JPEG scheme, and any encoding method may be used.

The one screen worth of RAW image data obtained by the image sensor unit 102 is further supplied to the RAW compression unit 113. The RAW compression unit 113 applies encoding (RAW compression) processing for reducing the data amount to the RAW image data to convert the RAW image data into compressed RAW image data (S312). The compressed RAW image data is stored in the buffer unit 115. Note that the encoding for the RAW image data may be either reversible or irreversible.

At S311, the recording and reproducing unit 151 records a still image file (simplified still image file) containing the simplified still image data in the recording medium 152.

At S313, the recording and reproducing unit 151 reads out the image data from the buffer unit 115, and records a data file (RAW file) in which the (compressed) RAW image data is stored in the recording medium 152.

Note that at least a part of the processing of generating and recording the simplified still image data (S310 to S311) and the processing of compressing and recording the RAW image data (S312 to S313) may be performed in parallel. In addition, at S311 and S313, the recording and reproducing unit 151 may send the still image file and/or the RAW file to an external storage from the communication terminal 154 via the communication unit 153, such that the still image file and/or the RAW file are recorded by the external storage.

Although a description has been given here of a case where the capturing instruction for a still image is provided at S308, basically the same processing may also be applied to a case where a capturing instruction for a moving image has been provided. First, the processing from S301 to S307 is the same. Then, the processing of generating and recording the simplified moving image data may be performed at S310 to S311, and the processing of compressing and recording the RAW data may be performed at S312 to S313. Note that when capturing a moving image, it is not necessary to newly perform capturing when a capturing instruction is given at S308, and the image data that has been captured at S302 and subjected to the simplified development at S304 may be used.

The simplified moving image data is generated for the moving image data constituted by the RAW image data obtained from the image sensor unit 102 by developing each frame image by the simplified development unit 111 at S310, and encoding the resulting image by the moving image compression unit 142. Then, the recording and reproducing unit 151 records the simplified moving image data at S311. As for the RAW data, the data resulting from compression of each RAW image frame at S312 is recorded by the recording and reproducing unit 151 through the buffer unit 115 at S313. Note that when capturing a moving image, the simplified moving image data is used for a live-view display for appropriately framing the subject, not only before the start of recording the moving image (during standby), but also during recording of the moving image (during REC).

Figure 3A:
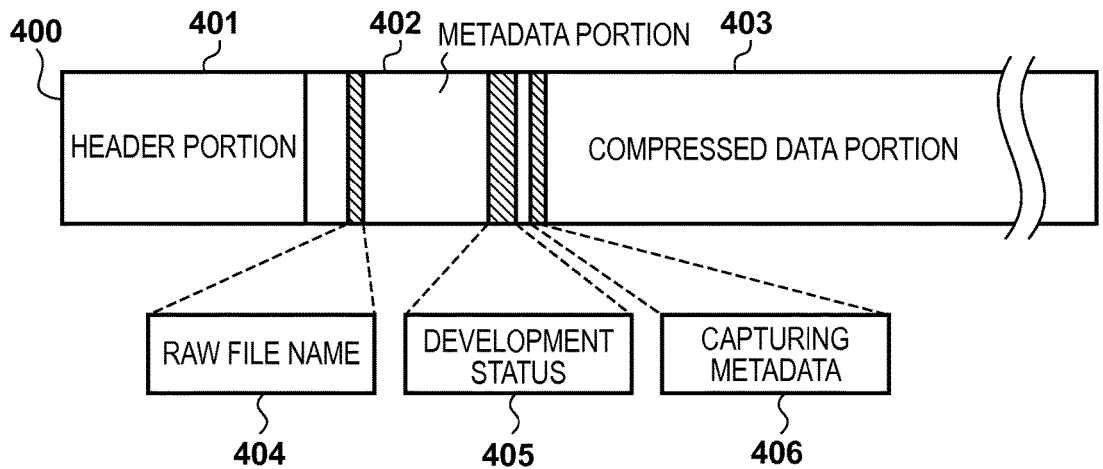
FIGS. 3A and 3B are diagrams showing exemplary configurations of a still image file and a RAW file in an embodiment.
Figure 3B:
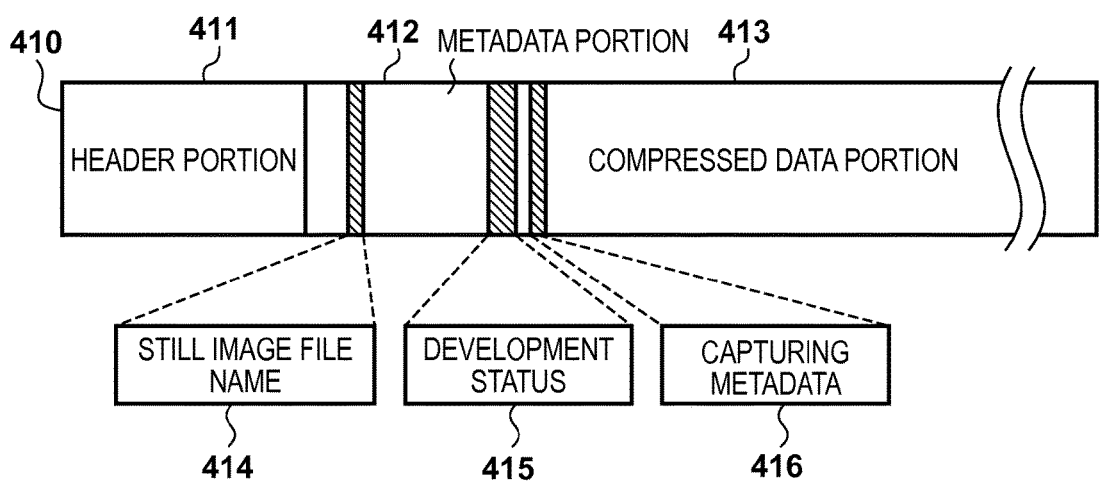

Next is a description of the structures of the still image file and the RAW file in the present embodiment. FIGS. 3A and 3B are diagrams showing exemplary configurations of the still image file and the RAW file.

FIG. 3A shows an exemplary structure of the still image file. A still image file 400 is composed of a header portion 401, a metadata portion 402, and a compressed data portion 403. The header portion 401 contains an identification code or the like that indicates that this file is a still image file. The compressed data portion 403 contains compressed data of a still image that has been subjected to high-efficiency encoding.

The metadata portion 402 contains information (e.g., a file name) 404 for specifying the (corresponding) RAW file (the file storing the RAW data from which the still image data stored in the compressed data portion 403 is originated) that has been generated concurrently with this still image file. In addition, the development status 405 is information that enables determination whether the compressed data stored in this still image file has been subjected to the simplified development. The capturing metadata 406 contains the evaluation values and the subject information obtained by the evaluation value calculation unit 105 and the recognition unit 131, information obtained during capturing (e.g., an aperture value, a shutter speed, sensitivity, lens type identification information, sensor type identification information, etc.) supplied from the imaging optical unit 101 and the image sensor unit 102. Although not shown, the metadata portion 402 may further contain an identification code of the recording medium in which the concurrently generated (corresponding) RAW file is recorded, path information of the recording destination, and the like. These pieces of metadata are sent, for example, from the control unit 161 to the recording and reproducing unit 151 and recorded therein.

As described thus far, the imaging apparatus 100 according to the present embodiment uses the simplified development unit 111 to perform the live-view display and the development process for a still image file generated in response to a capturing start instruction. In addition, the imaging apparatus 100 according to the present embodiment records the RAW file in response to the capturing start instruction. No development process is required to record the RAW file.

FIG. 3B shows an exemplary structure of a RAW file 410. The RAW file 410 is recorded in, for example, a predetermined recording area in the recording medium 152 by the recording and reproducing unit 151. The RAW file 410 is composed of a header portion 411, a metadata portion 412, and a compressed data portion 413. The header portion 411 contains an identification code or the like that indicates that this file is in a RAW file format. The compressed data portion 413 contains compressed RAW data of a still image that has been subjected to high-efficiency encoding (or may be non-compressed RAW image data).

The metadata portion 412 contains information (e.g., a file name) 414 for specifying the (corresponding) still image file that has been generated concurrently with this RAW file. The metadata portion 412 also contains a development status 415 indicating that the image data stored in the corresponding still image file has been subjected to the simplified development. The metadata portion 412 also contains capturing metadata 416 that is similar to the capturing metadata 406.

Although not shown, the metadata portion 412 may further contain an identification code of the recording medium or path information of the folder in which the concurrently generated still image file is recorded, or the like. Alternatively, the concurrently generated still image file itself may be converted into metadata, and stored in the metadata portion 412. These pieces of metadata are sent from, for example, the control unit 161 to the recording and reproducing unit 151, and recorded therein.

Note that the file structures illustrated in FIGS. 3A and 3B described herein are merely examples, and it is possible to adopt a configuration compliant with a different standard such as EXIF. In addition, the recording of a file to the recording medium 152 may be performed with a file system compliant with DCF, for example.

Note that the basic data structure of a moving image file is the same as that of the still image file except that the compressed data portion 403 contains compressed data of a moving image and sound that have been subjected to high-efficiency encoding and the compressed data is in an encoding format for moving images, such as AVCHD or MPEG2.

The imaging apparatus 100 according to the present embodiment uses the simplified development unit 111 to perform the live-view display until a capturing instruction is given and the development process for a still image file or moving image file generated in response to the capturing instruction in the capturing mode. The simplified development unit 111 achieves a development process for, for example, still images at 60 frames per second and moving images of a HD size with a small-scale and low power consumption circuit by limiting the size of an image after development to, for example, 2 million pixels or less, or restricting noise removal and optical distortion correction to a limited process or omitting them. On the other hand, the imaging apparatus 100 according to the present embodiment generates a RAW file of a still image or a moving image in response to a capturing instruction. The RAW file is a high image quality file that does not significantly compromise the image information supplied from the sensor signal processing unit 103, but generation of this file does not require a development process. Accordingly, even if the number of pixels or the continuous shooting speed is increased, or the number of pixels per frame or the frame rate is increased, it is possible to record the RAW file with a small-scale and low power consumption circuit.

Next is a description of a process of post development in the present embodiment. The post development process is a process of generating high-quality still image/moving image data from RAW image data and recording the generated data, after completion of the operation of recording the RAW image data and the simplified still image/moving image data during capturing. Specifically, first, the RAW image data recorded in the buffer unit 115 or the recording medium 152 or the like is read out, and developed by the high quality development unit 112. Then, high-quality encoded image data (second encoded image data) is generated in the still image compression unit 141 or the moving image compression unit 142, and the generated image data is recorded in the recording medium 152. In the present embodiment, the post development is applicable to the RAW image data of a still image and a moving image.

As described above, the simplified still image/moving image data recorded during capturing has been compressed after being developed by the simplified development unit 111. Accordingly, the image quality may be inferior or the number of pixels may be smaller, as compared with the case where the RAW image has been developed by the high quality development unit 112. The quality of the simplified still image/moving image data may be sufficient to roughly check the captured content immediately after capturing or to display the captured content in a display device with a small pixel number, such as the display unit 123 of the imaging apparatus 100, but may not be sufficient to check the details of the image or to print out the image.

The user may, of course, apply a high quality development process to the RAW image data as needed, but this requires time and effort. For this reason, in the present embodiment, the post development process is automatically executed when the imaging apparatus 100 is in an idle state. The idle state refers to a state in which the processing load of the imaging apparatus 100 is determined to be small, including, for example, during standby for capturing, a standby state during reproduction of a still image/moving image, and a sleep state. Note that in addition to being performed automatically, the post development process may be started in accordance with an instruction from the user.

There is no particular limitation on the method for determining whether or not the imaging apparatus 100 is in the idle state, and it is possible to use any determination method, including, for example, a commonly used measurement method for the processing load. For example, the determination may be made based on whether the operating ratio of the CPU included in the control unit 161 is less than a predefined threshold, or whether a predefined high-load operation such as a rapid continuous shooting operation or recording and reproducing processing is being performed. Alternatively, the imaging apparatus 100 may be unconditionally regarded as being in the idle state if an operating mode in which basically only a low-load process occurs is selected.

Figure 4:
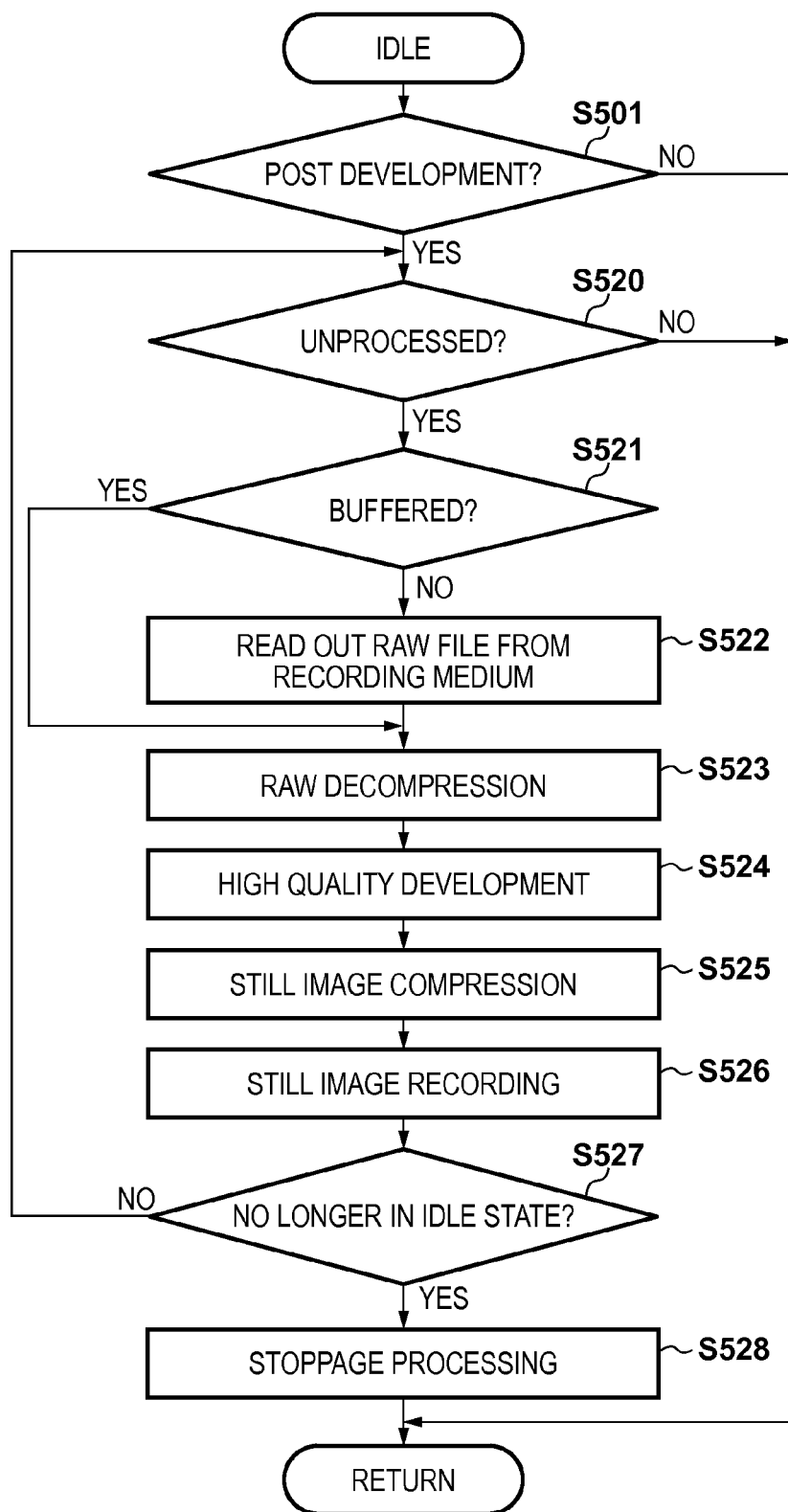
FIG. 4 is a flowchart illustrating operations in an idle state of the imaging apparatus according to an embodiment.

Next is a description of an idle process performed at S320 in FIG. 2, with reference to the flowchart in FIG. 4. Note that the idle process is performed if it is determined that the imaging apparatus 100 is in the idle state not only in the still image capturing mode, but also in other operating modes such as a still image/moving image reproduction mode.

The flowchart in FIG. 4 illustrates the processing procedure executed by the control unit 161 controlling various processing blocks, and the procedure is executed by a program stored in a memory (ROM) included in the control unit 161 being extracted into another memory (RAM) and executed by the CPU.

Upon start of the processing in an idle state in FIG. 4, the control unit 161 determines, based on the user's setting, whether or not to perform the post development (S501). If the post development is not to be performed, the control unit 161 ends the idle process, and returns to the original processing, and if the post development is to be performed, the processing transitions to S520.

In the case of performing the post development, the control unit 161 determines whether a high-quality still image file has been recorded by the post development process (whether it has been subjected to the post development) for each RAW file recorded in the recording medium 152 (S520). For example, the control unit 161 refers to the development status 415 in the RAW file 410, and determines that the RAW file has not been subjected to the post development if the development status 415 contains information indicating that the corresponding still image file has been processed by the simplified development unit 111. Alternatively, the control unit 161 searches for a still image file having the still image file name 414 contained in the metadata portion 412 of the RAW file in the recording medium 152. This is based on the fact that if capturing has been performed in the still image capturing mode, a single still image file and a single RAW file are recorded in association with each other for a single capturing start instruction in the recording medium 152. Then, the control unit 161 refers to the development status 405 stored in the metadata portion 402 of the found still image file 400. If the development status 405 contains the information indicating that the still image file 400 has been processed by the simplified development unit 111, the control unit 161 determines that the RAW file has not been subjected to the post development. Alternatively, a table indicating whether or not the post development process has been executed may be separately provided for a series of still images, and the determination may be made by referring to this table.

If all of the RAW files recorded in the recording medium 152 have been subjected to the post development process (S520, NO), the control unit 161 ends the idle process as in the case where the post development process is not applied, and returns to the original processing. On the other hand, if any RAW file to which the post development process has not been applied is present in the RAW files recorded in the recording medium 152, the control unit 161 causes the processing to transition to S521.

The control unit 161 checks whether the RAW image data corresponding to the RAW file that is recorded in the recording medium 152 and to which the post development process has not been applied is also stored in the buffer unit 115 (S521). Then, the control unit 161 reads out the RAW file directly from the buffer unit 115 if the RAW file remains in the buffer unit 115, or from the recording medium 152 at S522 if the RAW file does not remain in the buffer unit 115, and advances the processing to S523. A predefined number of RAW files are held in the buffer unit 115, starting from the most recently captured RAW file. Accordingly, the control unit 161 knows that the RAW file to which the post development process is applied is stored in the buffer unit 115 if the RAW file is included in the predefined number of RAW files starting from the most recently captured RAW file of the RAW files recorded in the recording medium 152. Note that the control unit 161 may obtain information on the RAW file obtained during recording from the recording and reproducing unit 151, and store the correspondence between the RAW file stored in the buffer unit 115 and the RAW file recorded in the recording medium 152.

Note that if there are a plurality of RAW files to which the post development process has not been applied and that are not present in the buffer unit 115, the control unit 161 may read out these RAW files one by one, and apply the post development process thereto, or may read out any number of RAW files at once within a range that can be stored in the buffer unit 115.

In the case of reading out the RAW files from the recording medium 152, the control unit 161 reads out the RAW files in a chronological order, and stores them in the buffer unit 115. Then, when the storage area in the buffer unit 115 becomes full, the oldest RAW image data is deleted from the buffer unit 115, and RAW image data that is newly captured or read out from the recording medium 152 is stored in the buffer unit 115. By doing so, the most recently captured RAW image data is always held in the buffer, and therefore, S522 can be skipped, thus performing the process at high speed. Furthermore, by executing the post development process backward in time from the most recently captured image, the process can be completed preferentially from the images held in the buffer unit 115, and it is thus possible to increase the processing efficiency.

At S523, the control unit 161 supplies the RAW image data to be subjected to the post development process to the RAW decompression unit 114. The RAW decompression unit 114 outputs the RAW image data after restoring the RAW image data by decompression if it has been compressed, or directly outputs the RAW image data if it has not been compressed. Whether or not the RAW image data has been compressed can be determined, for example, by recording identifiable information at the head of the RAW image data during compression.

The RAW image data output by the RAW decompression unit 114 is supplied to the development unit 110. During the post development process, the control unit 161 controls the operation such that the development process is applied by the high quality development unit 112 and the development process is not applied by the simplified development unit 111. The high quality development unit 112 applies a development process that can provide an image having higher image quality than that obtained by the simplified development unit 111 to the RAW image data (S524). In the present embodiment, the high quality development unit 112 does not reduce the number of pixels of the RAW image data, and increases the quality (e.g., precision and the number of steps) of the development process applied than that of the simplified development unit 111. However, there is no limitation on the specific details of the development process performed by the high quality development unit 112, as long as image processing that can provide an image having higher quality than that obtained by the simplified development unit 111 is performed. For example, the number of image pixels may be increased, with the details of the development process being the same as those of the simplified development unit 111. Alternatively, the number of image pixels may be reduced in the same manner, while increasing the quality of the development process.

The high quality development unit 112 applies the so-called development process, including, for example, debayering (demosaicing) a RAW image to convert the image into signals composed of a luminance and a color difference, removing noise contained in each signal, correcting optical distortion, and perform image optimization. The number of pixels of a developed image generated by the high quality development unit 112 remains the same as the number of pixels read out from the image sensor unit 102, or is a number of pixels set by the user. Accordingly, the number of pixels of the image data from the high quality development unit 112 is larger than that of the image data output from the simplified development unit 111.

While the high quality development unit 112 can provide a developed image having higher image quality because it performs various types of processing with higher precision than the simplified development unit 111, the processing load thereof is large. The high quality development unit 112 of the present embodiment avoids using a circuit that requires large power consumption and a high cost by not applying a real-time development process in parallel with capturing.

The image data developed by the high quality development unit 112 is supplied to the still image compression unit 141, and the still image compression unit 141 performs high-efficiency encoding processing (still image compression) on the obtained image data (S525), thus generating high-quality still image data.

At S526, the recording and reproducing unit 151 records a still image file containing the high-quality still image data in the recording medium 152.

S527 is processing of determining whether the imaging apparatus 100 is no longer in the idle state, and may be, for example, processing of determining whether a predefined event that causes the imaging apparatus 100 to exit from the idle state has occurred. The event may be, for example, input of a capturing preparation instruction or capturing start instruction, input of an instruction to execute reproduction processing, a CPU operating ratio exceeding the threshold, and the like. Note that the occurrence of these events is not performed at the timing indicated by S527 in fact, but is monitored in the background by the control unit 161 during the idle process. Whether the operation being performed is to be stopped or aborted upon detection of the occurrence of an event, or to be continued until the recording of a still image ends may be predefined. For example, the determination as to whether to continue, or stop or abort the processing may vary depending on which of the processing at S522 to S526 is being executed. Alternatively, the determination may vary depending on the event that has occurred. For example, the processing may transition immediately to capturing processing when an event for which a time lag raises a problem, such as a capturing start instruction, has occurred, and the processing may transition to reproduction processing after the recording of a still image ends when an event that is less urgent, such as an instruction to start reproduction, has occurred.

In the case of stopping the processing, the control unit 161 performs stoppage processing of storing the necessary information such that the stopped processing can be resumed when the imaging apparatus 100 next enters in the idle state (S528). The stoppage processing includes, for example, storing of data for which the process has not been completed and storing of position information indicating how far the process is completed (or from where the process is resumed). On the other hand, in the case of aborting the processing, the unprocessed RAW file may be processed in the next processing, and therefore, it is not necessary to perform the stoppage processing.

When the imaging apparatus 100 is no longer in the idle state, the control unit 161 transitions to the processing in accordance with the operating mode that was performed before the idle process has been performed and the event. For example, if a capturing instruction is input when the processing has transitioned from the still image capturing mode to the idle process, the control unit 161 causes the processing in the still image capturing mode to be resumed from the capturing processing at S310.

After the recording process has ended at S526, if the idle state is continued, the processing is returned to S520. If there is any remaining RAW image data to which the post development process has not been applied, the above-described processing is repeatedly performed.

The high-quality still image file recorded at S526 has the same configuration as that of the still image file of the image data processed by the simplified development unit 111 except that the development status 405 is information indicating that the still image file has been processed by the high quality development unit 112.

Note that the high-quality still image file recorded at S526 is recorded under the same file name as the simplified still image file recorded concurrently with the RAW file. This can be achieved by notifying of the still image file name contained in the metadata portion of the read out RAW file from the control unit 161 to the recording and reproducing unit 151. In the case of using the RAW image data remaining in the buffer unit 115, the metadata of the corresponding RAW file recorded in the recording medium 152 may be referred to. Alternatively, the recording and reproducing unit 151 may notify of the file name to the control unit 161 when recording the simplified still image file, and the control unit 161 may store the file name in association with the RAW image data in the buffer unit 115. With such a file name, the simplified still image file in the recording medium 152 can be replaced with the high-quality still image file.

When recording the high-quality still image file, the control unit 161 updates the development status 415 in the metadata portion 412 in the corresponding RAW file with information indicating that the high quality development has been performed thereon (or that the post development has been performed thereon) through the recording and reproducing unit 151.

Thus, the imaging apparatus 100 of the present embodiment executes the post development in a user operation waiting state in which the processing load of the apparatus is relatively small, including, for example, during intervals between captures, in the reproduction mode, and in the sleep state. Then, the still image file obtained by the simplified development during capturing is replaced with the still image file obtained by the high quality development using the RAW file. Consequently, even if a high-quality image is required, for example, for display for checking the details or print out, it is not necessary to execute the development process each time such an occasion arises, and the high-quality image can be utilized in the same general environment as with a conventional still image file.

Note that a moving image file obtained by the simplified development during capturing is also subjected to the post development process in the same manner, and is replaced with a moving image file obtained by the high quality development. Since each frame of the RAW moving image data is constituted by RAW image data, the frame can be developed in the same manner as the still image file. Then, by encoding the developed frame image in accordance with the encoding scheme of the moving image, a high-quality moving image file is successively generated. Note that in order to increase the efficiency of encoding processing, the unprocessed RAW file can be read out from the recording medium 152 in units of the number of frames (e.g., the number of frames constituting GOP) in accordance with the encoding scheme of the moving image.

In the case of stopping the post development process for the moving image file, for example, when the moving image compression unit 142 performs encoding in units of a predetermined number of frames in the stoppage processing at S528, the moving image compression unit 142 waits until a high-quality moving image file is written in the recording medium 152 for each encoding unit. Then, at the time of writing the high-quality moving image file (overwriting the simplified moving image file), the control unit 161 stores the file name of the RAW moving image data being subjected to the post development process and information indicating that the number of frames for which the process has ended. Alternatively or additionally, the same information is also recorded in the development status 405 of the metadata portion 402 of the high-quality moving image file. Then, at the next idle time, the post development process is resumed using this information. During the post development process of a moving image, each time a high-quality moving image file is written for each encoding unit, the file may be closed, and the management information of the recording medium 152 may be updated. Alternatively, processing of ending writing of these files may be performed during stoppage. While the former is more complicated processing, it requires less time for the processing to transition from the post development process to another process and can reduce the possibility of a damaged file and the like. Note that the post development process of a moving image is the same as the post development process of a still image in that the process may be immediately aborted depending on the event, but is different even in this case in that the currently processed moving image file in the recording medium 152 is closed.

Note that in the case of applying the post development process, it is possible to adopt a configuration in which the process is initially executed only for a predetermined time (e.g., one minute) from the beginning. The reason for this is as follows: a moving image file is composed of many frames such as several tens of frames/sec, and thus, if the post development process is applied to all frames of simplified moving image data for several minutes or several tens of minutes of a capturing period, for example, it will take a long time before the post development process for the next image file is started. Another reason is to prevent the battery consumption of the imaging apparatus from being excessively increased by the post development process. By performing the post development on only the head portion of the moving image file, it is possible to instantly perform display of a high quality image and reproduction of high-quality moving image file, while suppressing the battery consumption.

In the case of performing the post development only on a predetermined portion in this way, information for resuming the post development for an unprocessed portion is stored in the metadata of the moving image file or the control unit 161 after the post development for the predetermined portion has ended, as in the stoppage processing. Note that if there is no unprocessed image file, the post development process may be executed for an unprocessed portion. In this case as well, the post development process may be executed for a predetermined time for a single file.

Additionally, several steps may be provided as the method for determining whether the processing has been performed at S520. For example, whether the processing has been performed for the entire capturing time of moving images may be judged. Alternatively, a moving image may be partitioned for each predefined time (e.g., one minute) from the head portion, and, if the post development process has been performed for a predetermined time from the head of the moving image, it may be judged that the simplified moving image file has been processed. Furthermore, in the case of judging whether the post development process has been performed for a predetermined time, the time for judging whether the post development process has been performed can be set through an operation from the operation unit 162.

When only a portion such as the head portion has been subjected to the post development process, the simplified moving image file recorded concurrently with the RAW file will not be deleted. Then, the control unit 161 controls the recording and reproducing unit 151 so as to include, in the metadata portion 402 of the high-quality moving image file generated by the post development, identification information such as the file name of the corresponding simplified moving image file. Further, the control unit 161 controls the recording and reproducing unit 151 so as to include, in the metadata portion 402, the file name of the moving image file generated by the post development process, information that enables specification of a portion that has been subjected to the post development process, and the like, while holding the compressed data portion 403 of the simplified moving image file.

Thus, the imaging apparatus 100 of the present embodiment performs the post development in a user operation waiting state in which the processing load of the apparatus is relatively small, including, for example, during intervals between captures, in the reproduction mode, and in the sleep state. Then, the still image file obtained by the simplified development during capturing is replaced with the still image file obtained by the high quality development using the RAW file. The moving image file obtained by the simplified development during capturing is also replaced with the moving image file obtained by the high quality development using the RAW file. By doing so, even if a request for reproduction of a high-quality image is given, for example, for display for checking the details or print out, any unnecessary development process will not occur each time such an occasion arises, and the high-quality image can be utilized in the same general environment as with a conventional still image file.

Figure 5:
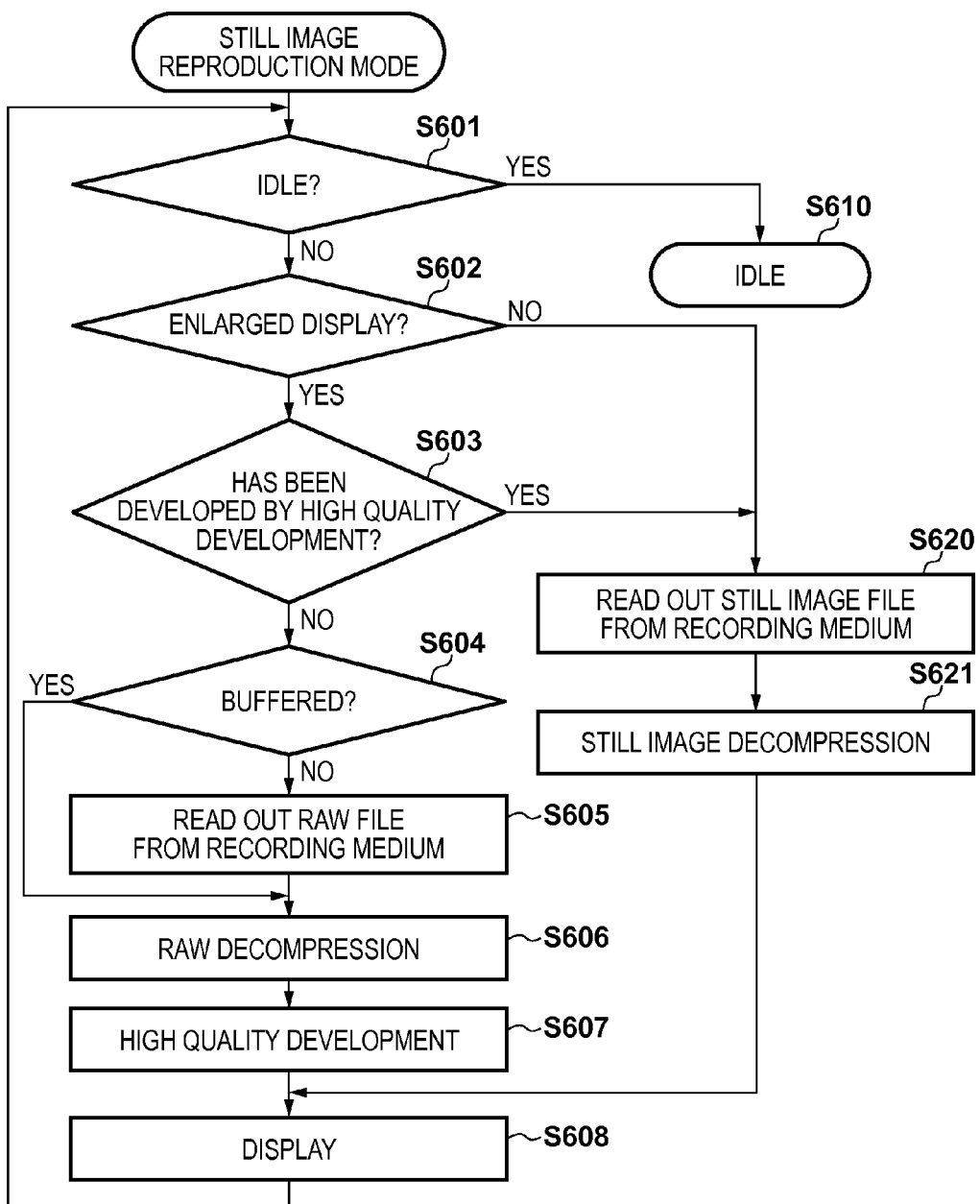
FIG. 5 is a flowchart illustrating operations in a still image reproduction mode of the imaging apparatus according to an embodiment.

Next is a description of the operations in a still image reproduction mode of the imaging apparatus 100 with reference to the flowchart shown in FIG. 5. Unless otherwise specified, the flowchart in FIG. 5 illustrates the procedure of the processing implemented by the control unit 161 controlling the functional blocks shown in FIG. 1. Specifically, the processing is implemented by loading a program, which is stored in a non-volatile memory included in the control unit 161, into a memory (RAM), and then executing the program by the CPU.

The control unit 161 determines whether the processing load state of the imaging apparatus 100 is low (S601), and causes the processing to transition to the idle state according to the load state (S610); otherwise it advances the processing to S602. The load state can be determined according to the operating ratio of the CPU included in the control unit 161, or whether a predefined high-load operation, including, for example, a rapid continuous shooting operation, is being performed, but the present invention is not limited thereto. If the processing load is not low enough to transition to the idle state, the control unit 161 advances the processing to S602. Note that the determination as to whether to transition to the idle state may be the same as that described in relation to the capturing mode operation.

For example, when the reproduction of a still image has been started (this includes the state of being reproduced) in response to an operation from the user, the control unit 161 advances the processing to S602. At S602, the control unit 161 determines whether an instruction for enlarged display of the still image has been given from the user. If the instruction for enlarged display has been received, the control unit 161 advances the processing to S603; and if not, it advances the processing to S620.

Figure 6A:
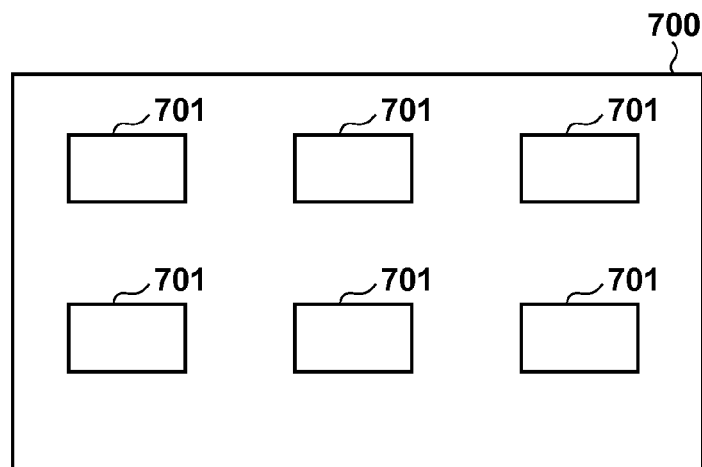
FIGS. 6A to 6C are diagrams showing an exemplary display in a still image reproduction mode of the imaging apparatus according to an embodiment.
Figure 6B:
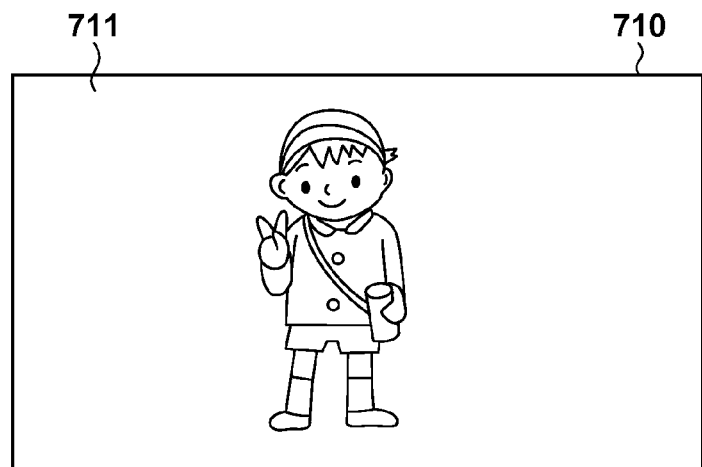
Figure 6C:

FIGS. 6A to 6C are diagrams schematically illustrating an exemplary form of display performed by the imaging apparatus 100 according to the present embodiment in the display unit 123 at the time of the still image reproduction.

A display screen 700 shown in FIG. 6A is an example in which a reduced image is displayed. Here, an example in which each display screen 700 displays six images. A display screen 710 shown in FIG. 6B is an example in which the whole of a single image 711 is displayed, and is in the state of normal display. A display screen 720 shown in FIG. 6C is an example in which an enlarged image 721 of a portion of a single image is displayed, and corresponds to enlarged display. Enlarged display is used, for example, in such a case where the suitability of focus is checked immediately after capturing. Enlarged display is also performed in response to an instruction for enlarged display from the user.

If an instruction for enlarged display has not been received at S602, the control unit 161 determines to perform normal display if the relationship between the number of display pixels A of the display unit 123 and the number of pixels B of the simplified still image file satisfies A≤B, and determines to perform reduced display if the relationship satisfies A>B.

At S620, the control unit 161 reads out a still image file to be reproduced from the recording medium 152 or the like through the recording and reproducing unit 151, and supplies the still image file to the still image decompression unit 143. Then, at S621, the control unit 161 supplies the still image file decompressed by the still image decompression unit 143 to the display processing unit 122. At S608, the display processing unit 122 outputs the image in such forms as those shown in FIGS. 6A to 6C to the display unit 123.

In the case of displaying the whole of an image, a still image file whose number of display pixels A is less than or equal to the number of pixels B of the still image file obtained by the simplified development, 2 million pixels in the above-described example, has sufficient image quality even if it has been developed by the simplified development unit 111. Needless to say, a still image file that has been developed by the high quality development unit 112 has sufficient image quality for whole image display.

On the other hand, in the case of achieving enlarged display by clipping a portion of an image and displaying it at an equal magnification, the number of pixels of the clipped portion of a still image file obtained by the simplified development may fall below the number of display pixels. In this case, it is necessary to perform enlargement processing such as pixel interpolation, leading to a reduced resolution.

Therefore, in the case of performing enlarged display, the control unit 161 determines, at S603, whether the still image file of an image to be displayed in an enlarged manner has been developed by the high quality development unit 112 (whether it has been subjected to the post development). The determination can be performed, for example, from a flag for identifying whether the still image file has been processed by the simplified development unit 111, the flag being contained in the development status 405 stored in the metadata portion 402 of the still image file 400. Alternatively, the determination can be performed by referring to the development status 415 in the RAW file 410, or by separately providing a table file indicating the state of the development process for a series of captured still images.

If it is determined at S603 that the still image to be displayed in an enlarged manner has been developed by the high quality development, the still image can be displayed in an enlarged manner with sufficient image quality. Accordingly, the control unit 161 advances the processing to S620, at which the still image file read out from the recording medium 152 or the like by the recording and reproducing unit 151 is displayed in the display unit 123 through the display processing unit 122.

If it is determined at S603 that the still image to be displayed in an enlarged manner has not been subjected to the high quality development, this means that the still image file has been developed by the simplified development unit 111. In this case, the control unit 161 performs the high quality development (the post development described above) by the processing from S604 onward. Although the high quality development is unconditionally executed here if the image file that has been subjected to the simplified development is to be displayed in an enlarged manner, the high quality development may be executed only if the number of pixels within the enlarged display area in the still image file obtained by the simplified development is less than the number of display pixels.

At S604, the control unit 161 checks whether the RAW file corresponding to the still image to be reproduced is present in the buffer unit 115. If the RAW file is not present in the buffer unit 115, the control unit 161 read outs the RAW file from the recording medium 152 or the like through the recording and reproducing unit 151 to the buffer unit 115 (S605).

The buffer unit 115 is updated such that a predetermined number of pieces of RAW data that have been most recently captured in the still image capturing mode are stored therein by deleting the RAW files in a chronological order. By doing so, the RAW data corresponding to the image file that has been relatively recently recorded in the recording medium 152 is held in the buffer unit 115, and it is therefore possible to skip S605, thus performing display processing at high speed.

At S606, the RAW decompression unit 114 restores the RAW image by decoding and decompressing the RAW file read out from the buffer unit 115. When the RAW image data within the RAW file has not been compressed, it is not necessary to perform the restoration processing.

The restored RAW image is supplied to the high quality development unit 112, in which the high quality development process is applied thereto (S607), and thereafter is output via the switch unit 121 to the display processing unit 122. At S608, the display processing unit 122 outputs an enlarged image as shown in FIG. 6C to the display unit 123. Note that the clipping of a partial image for enlarged display can be performed, for example, by the display processing unit 122 in accordance with an instruction from the control unit 161.

The high quality development unit 112 applies, to the RAW image, development processes such as debayering (demosaicing), conversion into a signal composed of a luminance and color difference, removal of noise contained in each signal, correction of optical distortion, and optimization of the image. The size (number of pixels) of a developed image generated by the high quality development unit 112 remains the same as the number of pixels read out from the image sensor unit 102, or is a size set by the user. Normally, this is significantly greater than the size (e.g., 2 million pixels or less) of an image that has been subjected to the simplified development, and therefore, a still image developed by the high quality development unit 112 can be displayed in an enlarged manner with sufficient image quality.

After display has been performed at S608, the control unit 161 returns the processing to S601. Note that the above-described processing is performed in accordance with an instruction to change the image to be displayed, an instruction to cancel enlarged display, an instruction to perform whole image display or enlarged display from a reduced display screen, or the like, and the control unit 161 generates and displays a display image in accordance with the instruction. For example, when an instruction to display the next or previous image is given in the state of whole image display, the control unit 161 performs the above-described processing on the image file recorded in the recording medium 152 after or immediately before the image being displayed, as a file to be displayed. As for the instruction to cancel enlarged display, the control unit 161 instructs the display processing unit 122 to cancel clipping and to display the whole of the image that has been subjected to the high quality development. In addition, when a single reduced image is selected from a reduced display screen, the control unit 161 causes the display processing unit 122 to perform normal display for the image file or RAW file corresponding to the selected reduced image.

In the present embodiment, the post development of still images is gradually executed when the apparatus enters a state in which the processing load of the apparatus is relatively small such as a state in which the processing load of the apparatus is small in the still image reproduction mode or a sleep state. Then, a still image file that has been subjected to the simplified development is automatically replaced with a still image file that has been subjected to the high quality development. As the replacement advances, the frequency with which the processing from S604 to S607 is performed is reduced even at the time of enlarged display, and enlarged display using a high quality image is performed smoothly, resulting in an even more improved operability.

For example, if the RAW file corresponding to the simplified image file displayed in reduced display or normal (whole image) display is not present in the buffer unit 115, the RAW file can be read out from the recording medium 152 in advance in order to shorten the time required for enlarged display of an image that has not been subjected to the high quality development process.

Next is a description of the operations in a moving image reproduction mode of the imaging apparatus 100 with reference to the flowchart shown in FIG. 7.

Unless otherwise specified, the flowchart in FIG. 7 illustrates the procedure of the processing implemented by the control unit 161 controlling the functional blocks shown in FIG. 1. Specifically, the processing is implemented by loading a program, which is stored in a non-volatile memory included in the control unit 161, into a memory (RAM), and then executing the program by the CPU.

Upon start of the processing of the moving image reproduction mode in FIG. 7, the control unit 161 determines whether the processing load state of the imaging apparatus 100 is low (S1101), and causes the processing to transition to the idle state if the load state is low (S1110); otherwise it advances the processing to S1102. Note that the determination as to whether to transition to the idle state may be the same as that described in relation to the capturing mode operation.

For example, the processing load is low while the apparatus is waiting for a user operation such as a reproduction instruction, and therefore, the control unit 161 advances the processing to S1110 to perform the idle process. On the other hand, the processing load is not low when the reproduction of a moving image has been started in accordance with an operation from the user (including the state of being reproduced), and therefore, the control unit 161 advances the processing to S1102.

At S1102, the control unit 161 determines whether the moving image file to be displayed that has been subjected to the high quality development process, for example, the moving image file for which a reproduction instruction has been given by the user, is present in the recording medium 152 or the like, and advances the processing to S1103 if the moving image file is present, and advances the processing to S1107 if it is not present. As described above, it can also be considered in this determination that a moving image file that has been subjected to the high quality development is present when there is a moving image file that has been subjected to the high quality development only for a head portion thereof.

At S1103, the control unit 161 determines whether the moving image file subjected to the high quality development process has been reproduced to the end. If it is determined that the moving image file subjected to the high quality development process has been reproduced to the end, the control unit 161 advances the processing to S1107, and advances the processing to S1104 if the reproduction of the moving image file subjected to the high quality development process is not completed.

At S1104, the control unit 161 reads out a predetermined amount of the moving image file to be reproduced from the recording medium 152 through the recording and reproducing unit 151, and supplies the moving image file to the moving image decompression unit 144. Then, at S1105, the moving image decompression unit 144 decodes and decompresses the read out moving image file frame by frame, and outputs the moving image file to the display processing unit 122. At S1106, the display processing unit 122 outputs a display image of the reproduced moving image to the display unit 123.

Note that display at S1106 is performed frame by frame, and, in order to perform display for the next frame, the control unit 161 returns the processing to S1101 during reproduction of the moving image.

At S1107, the control unit 161 determines whether the moving image file to be reproduced that has been subjected to the simplified development process is present in the recording medium 152 or the like, and advances the processing to S1108 if it is determined that the moving image file is present, and advances the processing to S1101 if it is determined that it is not present. Note that the absence of the moving image file that has been subjected to the simplified development process means that the moving image file to be reproduced has been subjected to the high quality development process to the end.

At S1108, the control unit 161 determines whether the reproduction of the moving image file that has been subjected to the simplified development process is completed. If it is determined at S1108 that the reproduction of the moving image file that has been subjected to the simplified development process is not completed, the control unit 161 advances the processing to S1109 to read out the moving image file to be reproduced that has been subjected to the simplified development process from the recording medium 152 through the recording and reproducing unit 151. The control unit 161 specifies the portion (e.g., the number of the last frame) that has been subjected to the high quality development process by using information stored during the stoppage processing at S528 or the metadata of the moving image file that is being reproduced, and reproduces the moving image file that has been subjected to the simplified development process from the frame following the portion that has been subjected to the high quality development process.

Then, at S1105, the moving image decompression unit 144 decodes and decompresses the read out moving image file frame by frame. At S1106, the display processing unit 122 outputs a display image of the reproduced moving image to the display unit 123.

If it is determined at S1108 that the reproduction of the moving image file that has been subjected to the simplified development process is completed, the control unit 161 returns the processing to S1001.

In the present embodiment, for a RAW file for which the post development process (high quality development process) has not been completed, both the moving image file that has been subjected to the simplified development process and the moving image file that has been subjected to the high quality development process are recorded in the recording medium 152 or the like. In this case, when the image quality of, for example, a moving image for which a reproduction instruction has been performed is reduced during reproduction, the user can know that the post development process has not been completed, but cannot easily know the specific state of progress. In addition, even in the case where the execution of reproduction or the post development process is instructed for a particular moving image file, it is more convenient if the user can know the current state of progress. Therefore, the present embodiment provides information that enables the user to easily know how far the post development process has progressed for the recorded moving image files.

The state of progress of the post development process can be known based on, for example, the information stored during the stoppage processing at S528. For example, when the number or time code for the last frame processed during the stoppage processing is stored, the ratio to the total number of frames or the total time obtained from the metadata of the RAW file represents the state of progress. Note that it is also possible to obtain this ratio by the stoppage processing, and store the ratio as one of the stop information in the development status 405 of the moving image file that has been subjected to the high quality development or in the control unit 161.

The control unit 161 can provide, from the operation unit 162, the information on the state of progress of the post development process to the user, for example, when an instruction to display the state of progress of the post development process is given via a menu screen or the like, or in a screen for selecting an image file to be reproduced.

FIGS. 8A to 8D show examples of a screen 1300 for presenting the information on the state of progress of the post development process, provided by the imaging apparatus 100 of the present embodiment. The examples show a case where the information indicating the state of progress of the post development process is added to a screen for browsing image files recorded in the recording medium 152 via thumbnail images. Note that this screen is also used as an index that enables the user to designate an image to be reproduced.

Although FIGS. 8A to 8D show examples in which thumbnails for six files are displayed for a single screen, there is no limitation on the number of thumbnail images per screen. In addition, other information such as the mode and parameters used during capturing and the information on the capturing date and time may be displayed. Although the examples in FIGS. 8A to 8D show the case where all of the six files are moving image files, they may include a still image file.

The control unit 161 obtains, for example, thumbnail images in order of the recording date and time from the latest one from among the image files recorded in the recording medium 152, and obtains the corresponding states of progress in the above-described manner. Then, the control unit 161 generates an image visually representing the state of progress, and supplies, to the display processing unit 122, image data of a screen in which the generated image is laid out in association with the thumbnail image. The display processing unit 122 displays the supplied image data in the display unit 123.

FIG. 8A is an example in which the state of progresses of the post development process are indicated by progress bars 1311 to 1316 in association with thumbnail images 1301 to 1306, respectively. The progress bars 1311 to 1316 represent the state of progress by the filled area, with the left edge corresponding to 0% and the right end corresponding to 100%. Since the progress bar 1316 corresponding to the thumbnail image 1306 is not shaded, it can be understood that the corresponding moving image file has not yet been subjected to the post development process. In addition, the color with which the progress bar is filled may be varied according to the ratio of progress (e.g., 0 to 30%: red, 30 to 60%: yellow, 70 to 99%: greenish yellow, 100%: green). Note that a specific numerical value (x % completed) or the like that represents the state of progress may be included within the progress bars 1311 to 1316.

FIG. 8B is an example in which the state of progress is indicated by numerical values. Here, the state of progress of the post development process is indicated by images 1321 to 1326 indicating the percentage of the processed portion with respect to the whole in association with the thumbnail images 1301 to 1306, respectively.

FIG. 8C is an example in which the state of progress is indicated by pie charts. Here, the state of progress of the post development process is indicated by the filled amounts of pie charts 1331 to 1336 respectively associated with the thumbnail images 1301 to 1306. The pie charts 1331 to 1336 represent the state of progress by the ratio of the area that is filled clockwise with the radius extending directly above from the center as an origin.

In the examples in FIGS. 8B and 8C as well, the characters and the filling color can be varied according to the ratio of progress. Additionally, in the example in FIG. 8C, a specific numerical value (x % completed) or the like that represents the state of progress may be included within the pie charts.

FIG. 8D is an example in which the state of progress of the post development process is indicated by certain characters in association with the thumbnail images 1301 to 1306, respectively. In the example in FIG. 8D, "Developing . . . " is added to images for which the post development process has not ended, and "Development completed" is added to images for which the post development process has ended. Note that the certain characters shown in FIG. 8D are merely examples, and other characters or words, or marks may also be used as long as they represent a progress or a status and has the effect of causing the user to recognize them.

In any of the examples in FIGS. 8A to 8D, the user selects one of the thumbnails with a cursor or through a touch operation and gives a reproduction command, and thereby the processing is shifted to a mode in which the image corresponding to the selected thumbnail is reproduced. In accordance with the reproduction command, the moving image that has been subjected to the high quality development process is reproduced from the beginning to the end if it is an image for which the post development process is completed. On the other hand, if the image is an image for which the post development process has not ended, the image that has been subjected to the high quality development process is reproduced at least in the beginning scene of the moving image, and thereafter (from a midpoint in the moving image) the image is reproduced while being seamlessly transitioned to the image that has been subjected to the simplified development process. Alternatively, there may be cases where the image that has been subjected to the simplified development process is reproduced from the beginning to the end.

Note that FIGS. 8A to 8C are merely examples of the information visually representing the state of progress of the post development process, and the information may be indicated by other methods. For example, it is also possible to adopt methods in which a thumbnail image itself may be used as a progress bar, and a semi-transparent filled image indicating the current ratio of progress may be superimposed on the thumbnail image, or a perpendicular line may be superimposed at a position corresponding to the ratio of progress. In addition, the information indicating the state of progress, such as a progress bar, may be displayed at other positions as long as the correspondence is clearly seen at a glance. For example, the information may be displayed so as to be superimposed on the thumbnail image. Further, the examples in FIGS. 8A to 8C and variations may be used in combination with characters as shown in FIG. 8D.

Although a description has been given here of moving image files, which can be easily described and understood, the state of progress can also be provided for still image files. Since the state of progress of a still image file is basically either a state in which the post development process is completed or an unprocessed state, the information indicating either the completed state or the unprocessed state may be displayed in association with the thumbnail image. The control unit 161 can determine that the post development process is completed if a still image file that has been subjected to the high quality development process is present for a given RAW still image file, and can determine that the RAW still image file is unprocessed if the still image is not present.

Although a description has been given in the above embodiment of an example in which the post development process is applied within the imaging apparatus 100, it is possible to adopt a configuration in which the post development process is applied in an external device 170 as in FIG. 10. FIG. 10 is a block diagram showing an exemplary system configuration composed of the imaging apparatus according to the present embodiment and an external device.

The progress information can also be known in the same manner in the case where a RAW file is transmitted via the communication unit 153 to the external device 170 such as an external general-purpose computer, a portable terminal, a storage, or a server, and is recorded therein, and the post development process is applied in the external device.

FIG. 10 shows an example in which the imaging apparatus 100 and the external device 170 are connected through a wired connection via a communication path. However, they may, of course, also be connected through a wireless connection, or the connection may be achieved via one or more networks.

The external device 170 includes an input/output buffer 1003 for image data and associated data, a storage 1005 storing RAW files and developed image files, and a high quality development processing unit 1007 having the same function as the imaging apparatus 100. When the external device 170 is a general-purpose computer or a portable terminal, the function of the high quality development processing unit 1007 that develops RAW image data with high quality is performed by a calculation unit (e.g., a CPU) operating in accordance with an application program and a memory, which are not shown. The external device 170 further includes a development process progress extraction unit 1009, manages input/output of RAW files stored in the storage 1005, and extracts, as information, the progress of the development process for the RAW files under management performed by the high quality development processing unit 1007.

The timing at which the RAW file is sent to the external device 170 by the communication unit 153 may be such that the RAW file is recorded in the external device 170 via the communication unit 153, along with the recording of the RAW file in the recording medium 152 or the like. Alternatively, the RAW file may be sent to the external device 170 after capturing is completed and then the recording of the RAW image data in the recording medium 152 or the like is completed.

The information indicating whether a RAW file is recorded by the external device 170 is stored as external device recording information within the capturing metadata 406 of the moving image file recorded in the recording medium 152 or within the memory of the control unit 161. As a result of the RAW file being recorded by the external device 170, the post development process based on the capability of the CPU or the like of the external device can be applied in the high quality development processing unit 1007 implemented in the external device 170.

As an example in which the RAW file is recorded in the external device 170, a description will be first given of a case where the RAW file is not present within the imaging apparatus 100, and is transferred to the external device 170. In this case, as in the case of the imaging apparatus 100, the state of progress of the post development process by the external device 170 can be stored in the development status 405 of the moving image file that has been subjected to the high quality development by the external device 170 and the development status 415 of the RAW file.

As for the timing at which the imaging apparatus 100 obtains the state of progress of the post development process by the external device 170, for example, it is possible to use a method in which the state of progress is obtained as information from the input/output buffer 1703 at the time of starting the imaging apparatus 100.

Furthermore, it is also possible to use a method in which the progress information is obtained by accessing the external device 170 periodically or at predetermined timing, regardless of the operating state of the imaging apparatus 100, or a method in which the external device 170 is accessed when the imaging apparatus 100 has transitioned to a particular mode or state such as the idle state.

After temporarily displaying the progress in the display unit 123 in the reproduction state, the imaging apparatus 100 accesses the external device 170 to obtain the progress information, and updates the display information of the display unit 123 if there has been a progress.

In addition to the method in which the imaging apparatus 100 actively accesses the external device 170, the external device 170 may issue an external interrupt command or the like according to the progress of the post development process. In this case, an access trigger for obtaining the progress information may be sent from the external device 170 to the imaging apparatus 100, and the imaging apparatus 100 may passively access the external device 170 in response to the trigger.

Along with the obtainment of the progress state, it is also possible to read out the developed high quality development moving image file from the external device 170 and transmit it to the imaging apparatus 100.

The state of progress obtained from the external device 170 via the communication unit 153 is stored in the capturing metadata 406 of the moving image file recorded in the recording medium 152 of the imaging apparatus 100, the control unit 161, or the like.

Doing so makes it possible to provide the state of progress of the post development process to the user even when the post development process is applied in the external device.

Next is a description of an example in which the RAW file is duplicated in the external device 170, and the RAW file is present within both the external device 170 and the imaging apparatus 100.

The RAW file is present in both the imaging apparatus 110 and the external device 170, and is subjected to the post development process in each of them.

The process may be more advanced in the imaging apparatus 100, or may be more advanced in the external device 170. Alternatively, various situations may occur, including, for example, a situation where the process is more advanced in the external device 170, but a high-quality moving image in the desired progress state cannot be obtained from the external device 170 via the communication unit 153 depending on the communication state of the imaging apparatus 110.

Figure 11:
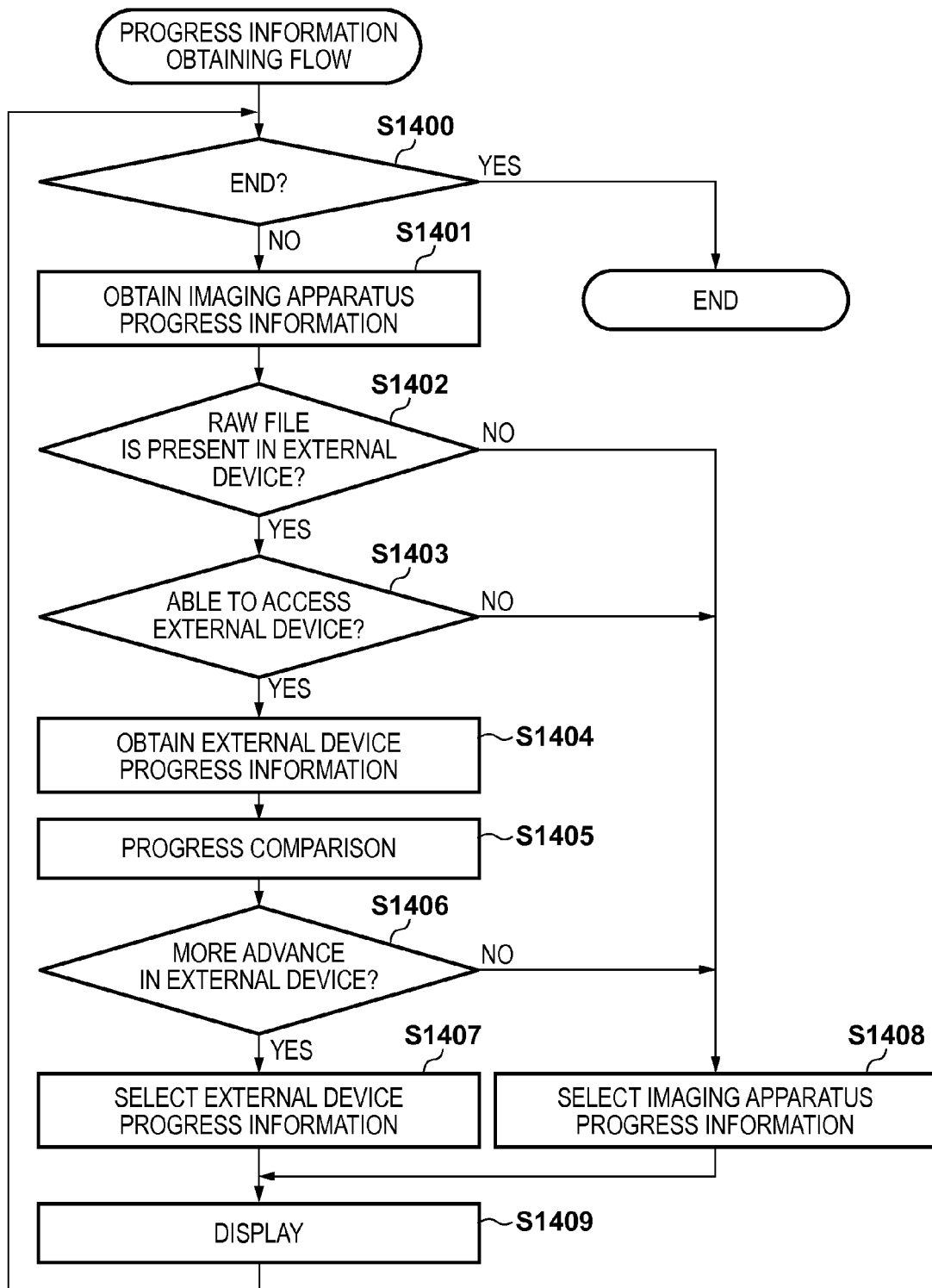
FIG. 11 is a flowchart illustrating an example of a progress information obtaining operation performed by the imaging apparatus according to an embodiment.

A description will be given of a flow of determining which of the progress information of the imaging apparatus and the progress information of the external device is used to perform display, with reference to the flowchart in FIG. 11. FIG. 11 is a flowchart illustrating an example of a progress information obtaining operation performed by the imaging apparatus according to the present embodiment.

In the flow of obtaining the state of progress, whether the flow needs to end is judged as a starting point (S1400). If the flow needs to end, the flow ends. If the flow need not to end, the progress information of the high quality development process is obtained by referring to the development status 405 of the moving image file located in the imaging apparatus 100 (S1401). At that time, the external device recording information recorded in the capturing metadata of the moving image file or the like is also obtained.

Next, at S1402, it is determined whether the RAW file is present in the external device 170 based on the external device recording information. If the RAW file is present in the external device, the processing transitions to S1403, and if not, the processing transitions to S1408.

At S1403, it is determined whether the imaging apparatus 100 is able to access the external device 170 via the communication unit 153. If it is judged that the imaging apparatus 100 is able to access the external device 170, the processing transitions to S1404. If it is judged that it is unable to access the external device 170, the processing transitions to S1408.

At S1404, the progress information of the high quality development process is obtained by referring to the development status 405 of the moving image file recorded within the external device 170, and the processing transitions to progress comparison status S1405.

At S1405, the progress information detected from the recorded file inside the imaging apparatus and the progress information obtained from the external device are compared. As a result of the comparison, if it is judged at S1406 that the development process is more advanced in the external device progress information, the processing transitions to S1407. If it is judged that the development process is more advanced in the imaging apparatus progress information, the processing transitions to S1408. In the present embodiment, the state of progress of the information in which the development process is more advanced is displayed.

At S1407, the external device progress information is selected as the progress information. At S1408, the imaging apparatus progress information is selected as the progress information.

The pieces of the progress information selected at S1407 and S1408 are displayed in the display unit 123 (S1409).

In addition to the case where a single external device is provided, the state of progress can also be displayed in the same manner in the case where the same RAW file is duplicated in a plurality of external devices, and the post development process is applied in each of the devices.

Doing so makes it possible to provide the state of progress of the post development process to the user even when the post development process is applied in the external devices.

As described thus far, according to the present embodiment, during capturing, an image obtained by applying the simplified development process to a RAW image is recorded together with the RAW image. Thereafter, the post development process is applied in which a development process that can provide an image having higher quality than that obtained by the simplified development process is applied to the recorded RAW image to generate a high-quality image, and the image obtained by the simplified development process is replaced with the high-quality image. This configuration makes it possible to achieve rapid continuous shooting or the like without a circuit that applies a development process at high speed, and also to easily check the content of the RAW image, for example, when the content is to be checked from another apparatus.

In addition, by automatically applying the post development process when the load of the imaging apparatus is low, a high-quality image can be obtained without the user being aware of the post development process. Accordingly, at the time of reproduction, a high-quality image can be immediately reproduced without the trouble of performing the post development process.

Furthermore, since the information indicating the state of progress of the post development process is presented, it is possible to select a moving image to be reproduced and to instruct execution of the high quality development process according to the state of progress, thus improving the user's convenience.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-062731, filed on Mar. 25, 2014 and 2015-008958, filed Jan. 20, 2015, which are hereby incorporated by reference herein in their entirety.

What is claimed is:

1. An imaging apparatus comprising:
an image sensor;
one or more processors; and
at least one memory coupled to the one or more processors, the at least one memory having instructions stored thereon which, when executed by the one or more processors cause the imaging apparatus to:
generate RAW moving image data representing an undeveloped moving image which is captured by the image sensor in response to a capturing instruction,
generate first developed moving image data by applying, to the RAW moving image data, a first development process or a second development process that provides a moving image having higher image quality than that obtained by the first development process,
read and write data from and to a recording medium,
write, in the recording medium, the RAW moving image data and the first developed moving image data obtained by applying the first development process to the RAW moving image data, and thereafter performing a post development process which generates second developed moving image data by applying the second development process to the RAW moving image data, which was written in the recording medium, and then writing the generated second developed moving image data in the recording medium, and
when thumbnail images are displayed for selecting any of the RAW moving image data recorded in the recording medium, display information indicating a ratio of progress of the post development process in association with respective thumbnail images.

2. The imaging apparatus according to claim 1,
wherein an image is displayed representing the RAW moving image data written in the recording medium and the information indicating a ratio of progress of the post development process for the RAW moving image data in association with each other.

3. The imaging apparatus according to claim 1,
wherein a progress bar, a numerical value, or a pie chart is displayed that indicates a ratio of the post development process that is completed as information representing the ratio of progress of the post development process.

4. The imaging apparatus according to claim 1,
wherein a character or a mark is displayed that represents a ratio of progress of the post development process, together with a thumbnail image representing the RAW moving image data.

5. The imaging apparatus according to claim 1,
wherein the post development process is able to be stopped and resumed, and
wherein information representing a ratio of progress of the post development process is generated based on position information stored when the post development process is stopped.

6. The imaging apparatus according to claim 1,
wherein the first development process has a lower processing load than the second development process.

7. The imaging apparatus according to claim 1,
wherein the first developed moving image data has a fewer number of pixels than the second developed moving image data.

8. The imaging apparatus according to claim 1,
wherein the first development process has at least one of a fewer number of steps and a lower precision than the second development process.

9. The imaging apparatus according to claim 1,
wherein either the first developed moving image data obtained by applying the first development process or the second developed moving image data obtained by applying the second development process is reproduced according to a progress of the post development process.

10. An imaging apparatus comprising:
one or more processors; and
at least one memory coupled to the one or more processors, the at least one memory having instructions stored thereon which, when executed by the one or more processors, cause the imaging apparatus to:
generate RAW image data representing an undeveloped image which is captured by an image sensor in response to a capturing instruction,
generate image data by applying, to the RAW image data, a first development process or a second development process that can provide an image having higher image quality than that obtained by the first development process,
read and write data from and to a recording medium,
write, in the recording medium, the RAW image data and first image data obtained by applying the first development process to the RAW image data, and thereafter performing a post development process in which second image data is generated by applying the second development process to the RAW image data, which was written in the recording medium, and then writing the generated second image data in the recording medium, and
display information indicating a state of progress of the post development process for the RAW image data written in the recording medium,
wherein, when the post development process for the RAW image data written in the recording medium has not yet ended, the second image data obtained by applying the second development process is reproduced in at least a beginning scene of a moving image, and the first image data obtained by applying the first development process is reproduced from a midpoint in the moving image, in accordance with a reproduction command.

11. The imaging apparatus according to claim 1,
wherein the recording medium is a storage located in an external device of the imaging apparatus, and
wherein the information indicating a ratio of progress of the post development process is displayed based on progress information obtained from the external device.

12. The imaging apparatus according to claim 11,
wherein the instructions, when executed by the one or more processors, further cause the imaging apparatus to obtain the information indicating the ratio of progress of the post development process from the external device via a communication path.

13. The imaging apparatus according to claim 11,
wherein the recording medium includes a recording unit located in the imaging apparatus and a storage located in the external device of the imaging apparatus, and
wherein the information indicating the ratio of progress of the post development process is displayed based on a result of comparison between progress information detected inside the imaging apparatus and the progress information obtained from the external device.

14. The imaging apparatus according to claim 13,
wherein the ratio of progress of the post development process is displayed based on one of the progress information detected inside the imaging apparatus and the progress information obtained from the external device, which indicates a higher ratio of progress of the post development process.

15. The imaging apparatus according to claim 11,
wherein the external device is a portable terminal that executes a high quality development process of developing the RAW moving image data with high image quality, in accordance with an application program.

16. The imaging apparatus according to claim 11,
wherein the external device is a general-purpose computer that executes a high quality development process of developing the RAW moving image data with high image quality, in accordance with an application program.

17. The imaging apparatus according to claim 11,
wherein the external device is a server including a high quality development processing unit that develops the RAW moving image data with high image quality.

18. A control method of an imaging apparatus, the imaging apparatus having an image sensor and configured to generate RAW moving image data representing an undeveloped image which is captured by the image sensor in response to a capturing instruction, to generate first developed moving image data by applying, to the RAW moving image data, a first development process or a second development process that provides a moving image having higher image quality than that obtained by the first development process, and to read and write data from and to a recording medium, the method comprising the steps of:
writing, in the recording medium, the RAW moving image data and the first developed moving image data obtained by applying the first development process to the RAW moving image data;
performing a post development process which generates second developed moving image data by applying the second development process to the RAW moving image data, which was written in the recording medium, and then writing the generated second developed moving image data in the recording medium; and
when thumbnail images are displayed for selecting any of the RAW moving image data recorded in the recording medium, displaying information indicating a ratio of progress of the post development process in association with respective thumbnail images.

19. A non-transitory computer-readable recording medium having stored therein a program for causing a computer, which is included in an imaging apparatus having an image sensor and configured to generate RAW moving image data representing an undeveloped moving image which is captured by the image sensor in response to a capturing instruction, to:
generate first developed moving image data by applying, to the RAW moving image data, a first development process or a second development process that provides a moving image having higher image quality than that obtained by the first development process;
read and write data from and to a recording medium;
perform a post development process which generates second developed moving image data by applying the second development process to the RAW moving image data, which was written in the recording medium, and then writing the generated second developed moving image data in the recording medium; and
when thumbnail images are displayed for selecting any of the RAW moving image data recorded in the recording medium, display information indicating a ratio of progress of the post development process in association with respective thumbnail images.

* * * * *